US 007756911B2

(12) United States Patent
Bacon et al.

(10) Patent No.: US 7,756,911 B2
(45) Date of Patent: Jul. 13, 2010

(54) METHOD AND SYSTEM FOR EXECUTING A TASK AND MEDIUM STORING A PROGRAM THEREFOR

(75) Inventors: David Francis Bacon, Sleepy Hollow, NY (US); Perry Sze-Din Cheng, New York City, NY (US); David Paul Grove, Ridgefield, CT (US); Daniel J. Spoonhower, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 11/449,774

(22) Filed: Jun. 9, 2006

(65) Prior Publication Data

US 2007/0288538 A1    Dec. 13, 2007

(51) Int. Cl.
*G06F 12/00* (2006.01)
*G06F 17/30* (2006.01)
(52) U.S. Cl. ................... 707/813; 707/999.206
(58) Field of Classification Search ............... 707/206
See application file for complete search history.

(56) References Cited

U.S. PATENT DOCUMENTS

| | | | | | |
|---|---|---|---|---|---|
| 4,853,842 | A | * | 8/1989 | Thatte et al. | 707/206 |
| 5,088,036 | A | * | 2/1992 | Ellis et al. | 707/206 |
| 5,293,614 | A | * | 3/1994 | Ferguson et al. | 707/201 |
| 5,485,613 | A | * | 1/1996 | Engelstad et al. | 707/206 |
| 5,581,722 | A | * | 12/1996 | Welland | 711/207 |
| 5,761,670 | A | * | 6/1998 | Joy | 707/103 R |
| 6,021,469 | A | * | 2/2000 | Tremblay et al. | 711/125 |
| 6,081,665 | A | * | 6/2000 | Nilsen et al. | 717/116 |
| 6,233,621 | B1 | * | 5/2001 | Joy | 719/315 |
| 6,526,421 | B1 | * | 2/2003 | Houldsworth | 707/206 |
| 6,546,546 | B1 | * | 4/2003 | Van Doorn | 717/114 |
| 6,684,392 | B2 | * | 1/2004 | Eidt | 717/148 |
| 6,704,756 | B2 | * | 3/2004 | Wollrath et al. | 707/206 |
| 6,728,737 | B2 | * | 4/2004 | Wollrath et al. | 707/206 |
| 6,801,990 | B2 | * | 10/2004 | Knippel et al. | 711/170 |
| 6,807,551 | B2 | * | 10/2004 | Sayag | 707/206 |
| 6,842,838 | B2 | * | 1/2005 | Heller et al. | 711/170 |
| 6,874,074 | B1 | * | 3/2005 | Burton et al. | 711/170 |
| 6,898,611 | B1 | * | 5/2005 | Dussud et al. | 707/206 |
| 6,957,237 | B1 | * | 10/2005 | Traversat et al. | 707/206 |
| 7,293,051 | B1 | * | 11/2007 | Printezis et al. | 707/206 |
| 7,299,242 | B2 | * | 11/2007 | Moir et al. | 707/103 Z |
| 7,484,067 | B1 | * | 1/2009 | Bollella et al. | 711/170 |
| 2002/0056019 | A1 | * | 5/2002 | Kolodner et al. | 711/6 |
| 2002/0099765 | A1 | * | 7/2002 | Otis | 709/203 |
| 2002/0120640 | A1 | * | 8/2002 | Hills | 707/206 |

(Continued)

OTHER PUBLICATIONS

Henriksson, Roger, "Scheduling Garbage Collection in Embedded Systems", Jul. 1998.*

(Continued)

*Primary Examiner*—Mohammad Ali
*Assistant Examiner*—Griselle Corbo
(74) *Attorney, Agent, or Firm*—Vazken Alexanian; McGinn IP Law Group, PLLC

(57) ABSTRACT

A method (and system) for executing a task includes executing a first task in which garbage is collected using a garbage collector, and executing a second task, the garbage collector being preemptable (e.g., preempted) by the second task.

14 Claims, 15 Drawing Sheets

U.S. PATENT DOCUMENTS

| | | | |
|---|---|---|---|
| 2003/0126352 A1* | 7/2003 | Barrett | 711/100 |
| 2004/0039759 A1* | 2/2004 | Detlefs et al. | 707/206 |
| 2004/0111451 A1* | 6/2004 | Garthwaite | 707/206 |
| 2006/0059453 A1* | 3/2006 | Kuck et al. | 717/100 |
| 2008/0021939 A1* | 1/2008 | Dahlstedt et al. | 707/206 |

OTHER PUBLICATIONS

Chandrasekhar Boyapati , Alexandru Salcianu , William Beebee, Jr. , Martin Rinard, Ownership types for safe region-based memory management in real-time Java, Proceedings of the ACM SIGPLAN 2003 conference on Programming language design and implementation, Jun. 9-11, 2003, San Diego, California, USA.*

Bacon, D.F., Cheng, P., and Rajan, V. 2003. The metronome: A simpler approach to garbage collection in real-time systems. In Workshop on Java Technologies for Real-Time and Embedded Systems (JTRES), OTM Workshops. 466-478.*

Bacon, D.F., Cheng, P., and Rajan, V. Jan. 2003. A Real-time Garbage Collector with Low Overhead and Consistent Utilization, in POPL '03, 285-298.*

* cited by examiner

```
1  class: LowFrequencyTask extends Thread {
2    EventronReadChannelOfShort channel;
3    ...
4    public void run() {
5      short[] samples=new short[MAX DURATION];
6      while (composing) {
7        Note note=composer.nextNote();
8        int length=note.toSamples(samples);
9        channel.write(samples, length);
10     }
11     channel.close();
12   }
13 }
```

FIG. 4

```
1   class HighFrequencyTask implements Runnable {
2       final EventronReadChannelOfShort channel;
3       final RuntimeException errorStop=
4           new RuntimeException("Write error occurred");
5       final RuntimeException normalStop=
6           new RuntimeException("Channel closed");
7       int missedSamples = 0;
8       ...
9       private static native boolean playSample(short sample);
10
11      public void run() {
12          short sample= channel.read();
13          if (sample==channel.CHANNEL EMPTY) {
14              missedSamples++;
15              sample= Composer.SILENCE SAMPLE;
16          else if (sample==channel.CHANNEL CLOSED) {
17              throw normalStop;
18          }
19          }
20          if (!playSample(sample)) {
21              throw errorStop;
22          }
23      }
    }
```

FIG. 5

```
1   final long AUDIO FREQ HZ = 22050L;
2   final long AUDIO PERIOD NS = 1000000000L / AUDIO FREQ HZ;
3   final long GC LATENCY NS = GarbageCollector.maximumLatency();
4   final int BUFFER SIZE = (int) (GC LATENCY NS/AUDIO PERIOD NS);
5   final int BUFFERS = 3;
6   final int PRELOAD SAMPLES = BUFFER SIZE * (BUFFERS-1);
7
8   public void playMusic(Composer composer) {
9       FileOutputStream soundDevice = composer.openSoundDevice();
10
11      EventronReadChannelOfShort channel=
12          new EventronReadChannelOf Short(BUFFER SIZE, BUFFERS);
13      channel.write(Composer.SILENCE SAMPLE, PRELOAD SAMPLES);
14
15      Runnable runnable = new HighFrequencyTask(channel, soundDevice);
16      Eventron player = Eventron.validate(runnable);
17
18      Thread synthesizer = new LowFrequencyTask(channel);
19      synthesizer.start();
20
21      player.schedulePeriodic(AUDIO PERIOD NS);
22      ...
23      player.unschedule();
24      Throwable status = player.getExceptionState();
25  }
```

FIG. 6

| Bytecode | Illegal Unless... |
|---|---|
| new, newarray | |
| anewarray, multianewarray | |
| monitorenter, monitorexit | |
| invokevirtual | non-synchronized method |
| invokestatic | non-synchronized method |
| invokespecial | non-synchronized method |
| invokeinterface | non-synchronized method |
| putfield, putstatic | Primitive type |
| getfield, getstatic | Primitive type or final |
| aload | |
| aastore | From Final Array |

FIG. 8A

| Class | Illegal Methods |
|---|---|
| java.lang.Object | clone, wait, notify, notifyAll |
| java.lang.Class | newInstance |
| java.lang.reflect.Constructor | newInstance |
| java.lang.reflect.Field | get, set |
| java.lang.reflect.Array | newInstance, set, get |
| java.lang.reflect.Method | invoke |

FIG. 8B

```
1   class EventronSupport
2   {
3     static native void pinObjects(Object[] o);
4     static native void unpinObjects(Object[]o);
5     static native void becomeEventronThread();
6     static native void becomeOrdinaryThread();
7   }
```

FIG. 9

| Name | Methods | LOC | Validation Time (ms) |
|------|---------|-----|----------------------|
| Null | 1 | 1 | 0.11 |
| Audible | 4 | 87 | 4.16 |
| FFT | 8 | 139 | 4.58 |

FIG. 10

METHOD AND SYSTEM FOR EXECUTING A TASK AND MEDIUM STORING A PROGRAM THEREFOR

BACKGROUND OF THE INVENTION

1. Field of the Invention

The present invention relates to a method (and system) for executing a task and, more particularly, to a method of executing a task (e.g., a low latency task) which includes executing a second task, a garbage collector in a first task being preemptable by said second task.

2. Description of the Related Art

The complexity of real-time systems is increasing rapidly as the isolated real-time controllers of the past give way to complex systems in which many coordinated systems interact to create an integrated multi-level real-time system, such as a car or a ship. In the face of this huge increase in complexity, traditional real-time methodologies based on low-level coding styles and fixed data structures are no longer tenable.

Java's software engineering benefits have made it a compelling choice for modular application development: memory safety, a standardized model of concurrency, and a host of common libraries make it possible to develop large and complex applications in a piecewise fashion. With the development of Metronome real-time garbage collection technology and the Real-Time Specification for Java (RTSJ) standard, Java has become a viable platform for the creation of such complex real-time systems. However, there are many problems remaining before a dynamic, garbage collected language like Java can provide a complete real-time solution down to the lowest-level, highest-frequency applications.

Real-time garbage collection, as exemplified by the Metronome system, is currently able to achieve worst-case latencies on the order of a millisecond. This latency bound may scale down by another factor of two to four as a result of improved implementation techniques. However, latency is limited by the need for atomic processing of certain data structures, and by the overhead of context switching, especially since the collector tends to evict much of the application data from the cache.

As a result, real-time Java programmers with response time requirements below a millisecond are currently forced to resort to the RTSJ's NoHeapRealtimeThread (NHRT) construct. As its rather verbose moniker implies, code executed by an NHRT is isolated from the garbage-collected heap and may therefore be run concurrently with the collector or interrupt it arbitrarily. However, NHRTs may only create and access objects in the manually-managed Immortal and Scoped memory areas.

Unfortunately, this requires fundamental changes to the semantics of the Java programming language. Scopes essentially provide region-based memory management with neither explicit region qualifiers nor implicit region inference. As a result, the region restrictions of a method are not documented in its interface and may vary dynamically based on its inputs. This greatly lowers the level of abstraction of the language, requires expensive run-time checks, and makes it difficult to reason about the behavior of an object without understanding its implementation.

Most perniciously, NHRTs require dynamic checks on both reads and writes of reference fields to guarantee that region constraints are not violated. These dynamic checks will throw exceptions when they fail, while reading or writing reference fields of an object in the heap will never throw an exception. This represents a deep change to the language semantics and a significant obstacle to code re-use.

SUMMARY OF THE INVENTION

In view of the foregoing and other exemplary problems, drawbacks, and disadvantages of the conventional systems and methods, a purpose of the exemplary aspects of the present invention is to provide a method (and system) of executing a task (e.g., a low latency task) that may be simpler to program and implement, more reliable and more efficient than other approaches.

In an exemplary embodiment of the present invention, a method for executing a task (e.g., a low latency task) includes executing a first task in which garbage is collected using a garbage collector, and executing a second task, the garbage collector being preemptable (e.g., preempted) by the second task.

In an exemplary aspect of the present invention, a second task (which can preempt the garbage collector) may have a lower latency (e.g., higher frequency) than a first task.

In another embodiment of the present invention, a method of executing a task includes executing a first task in which garbage is collected using a garbage collector, initializing a second task by: constructing an instance of a class that implements a standard runnable thread interface, and creating a data structure for supporting communication and synchronization between the second task and lower priority threads (e.g., threads having a lower priority than the second task), validating the second task to ensure that the second task is executable without synchronizing with the first task, instantiating the second task to create a class for the executing the second task by one of: creating an executable thread that will repeatedly invoke the second task, and associating the second task with an interrupt handler and executing a second task, the garbage collector being preemptable (e.g., preempted) by the second task.

In another exemplary embodiment of the present invention, a system for executing a task includes a first executing module for executing a first task in which garbage is collected using a garbage collector, and a second executing module for executing a second task which preempts said garbage collector.

In another exemplary embodiment of the present invention, an interrupt handler for an operating system includes an interrupt module for interrupting an operation in the operating system, and a system for executing a task including a first executing module for executing a first task in which garbage is collected using a garbage collector, and a second executing module for executing a second task which is associated with the interrupt module and the garbage collector being preemptable (e.g., preempted) by the second task.

Another exemplary embodiment of the present invention includes a programmable storage medium tangibly embodying a program of machine-readable instructions executable by a digital processing apparatus to perform a method of executing a task according to the present invention.

In another exemplary embodiment, the method according to the present invention may include deploying computing infrastructure in which computer-readable code is integrated into a computing system, such that the code and the computing system combine to perform the executing of the first task in which garbage is collected using a garbage collector, and the executing a second task, the garbage collector being preemptable (e.g., preempted) by the second task.

With its unique and novel features, the present invention provides a method (and system) of executing a task (e.g., a low latency task) which may be simpler to program and implement, more reliable and more efficient than other approaches.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 illustrates code for implementing a low-frequency task according to an exemplary aspect of the present invention; according to an exemplary aspect of the present invention;

FIG. 5 illustrates code for implementing a high-frequency task according to an exemplary aspect of the present invention;

FIG. 6 illustrates code for implementing task integration according to an exemplary aspect of the present invention;

FIGS. 8A and 8B provide code for operations that may be illegal according to an exemplary aspect of the present invention;

FIG. 9 illustrates how an interface to run-time support operations may be added to a virtual machine to support the Construct according to an exemplary aspect of the present invention;

FIG. 10 provides Table 1 which includes Validation times for several exemplary Constructs according to an exemplary aspect of the present invention;

DETAILED DESCRIPTION OF EXEMPLARY EMBODIMENTS OF THE INVENTION

Figure 1:
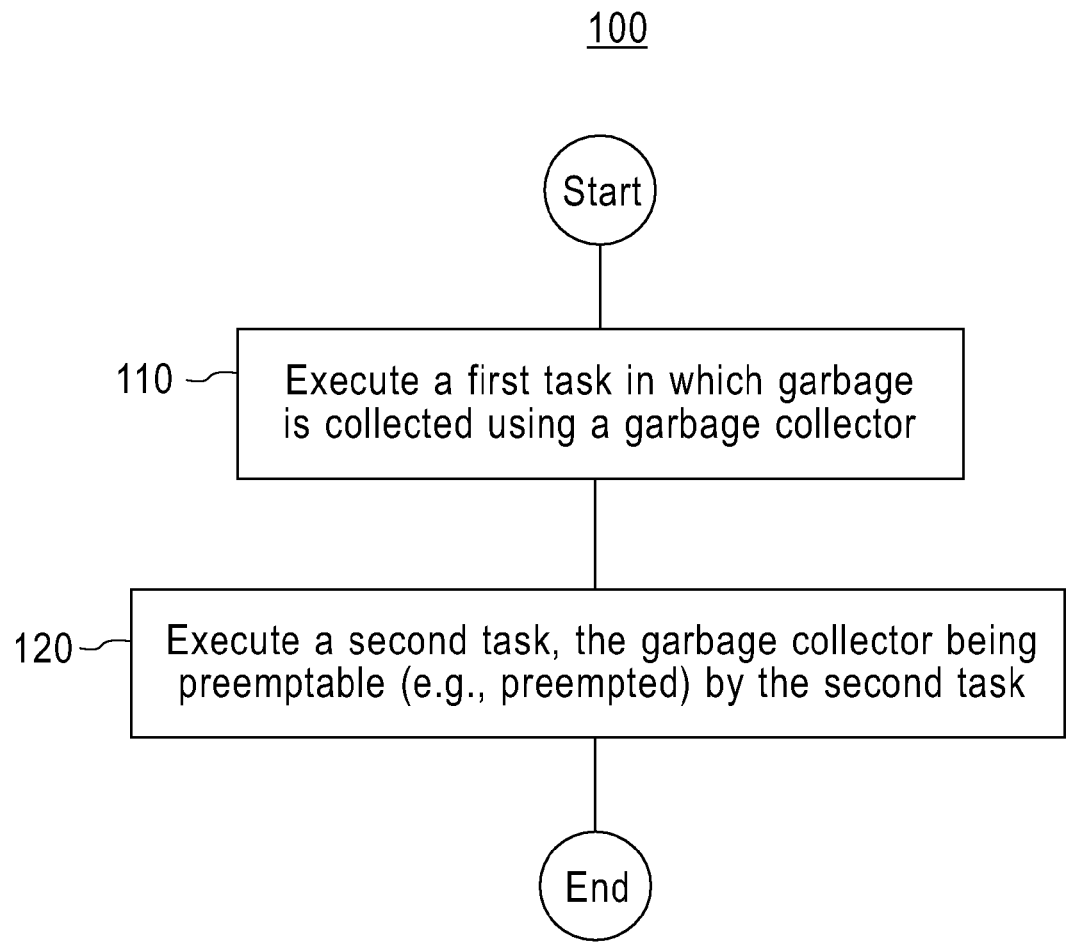
FIG. 1 illustrates a method 100 of executing a task according to an exemplary aspect of the present invention.

Referring now to the drawings, and more particularly to FIGS. 1-19, there are shown exemplary embodiments of the method and structures of the present invention.

FIG. 1 illustrates a method 100 for executing a task according to an exemplary aspect of the present invention. The method 100 includes executing (110) a first task in which garbage is collected using a garbage collector, and executing (120) a second task, the garbage collector being preemptable (e.g., preempted) by the second task.

In an exemplary aspect of the present invention, a second task (which can preempt the garbage collector) may have a lower latency (e.g., higher frequency) than a first task.

Figure 2:
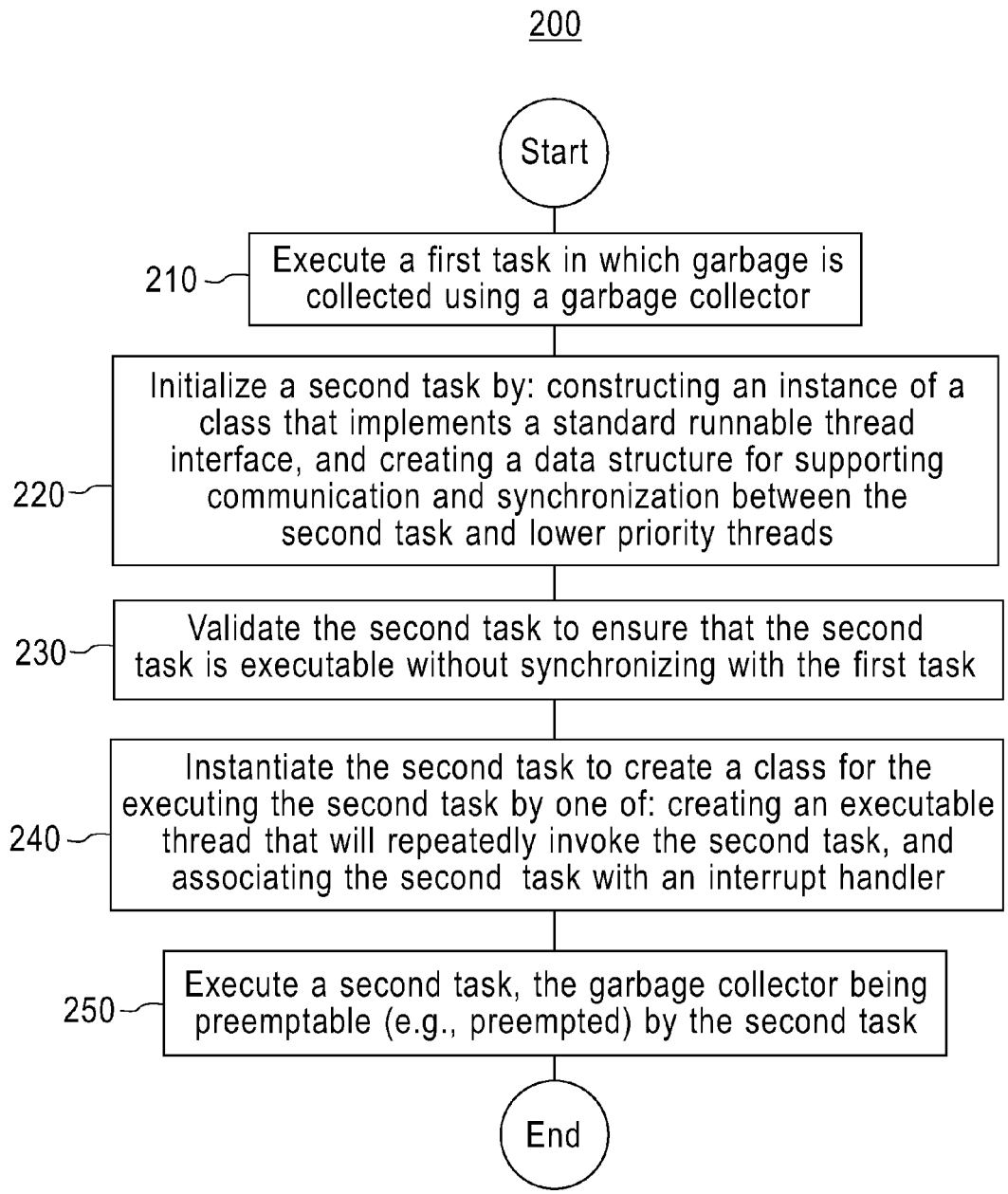
FIG. 2 illustrates a method 200 of executing a task according to an exemplary aspect of the present invention.

FIG. 2 illustrates method 200 for executing a task according to another exemplary aspect of the present invention. The method 200 includes executing (210) a first task in which garbage is collected using a garbage collector, initializing (220) a second task by constructing an instance of a class that implements a standard Runnable thread interface, and creating a data structure for supporting communication and synchronization between the second task and lower priority threads (e.g., threads having a lower priority than the second task), validating (230) the second task to ensure that the second task is executable without synchronizing with the first task, instantiating (240) the second task to create a class for the executing the second task by one of creating an executable thread that will repeatedly invoke the second task, and associating the second task with an interrupt handler, and executing (250) a second task, the garbage collector being preemptable (e.g., preempted) by the second task.

Figure 3:
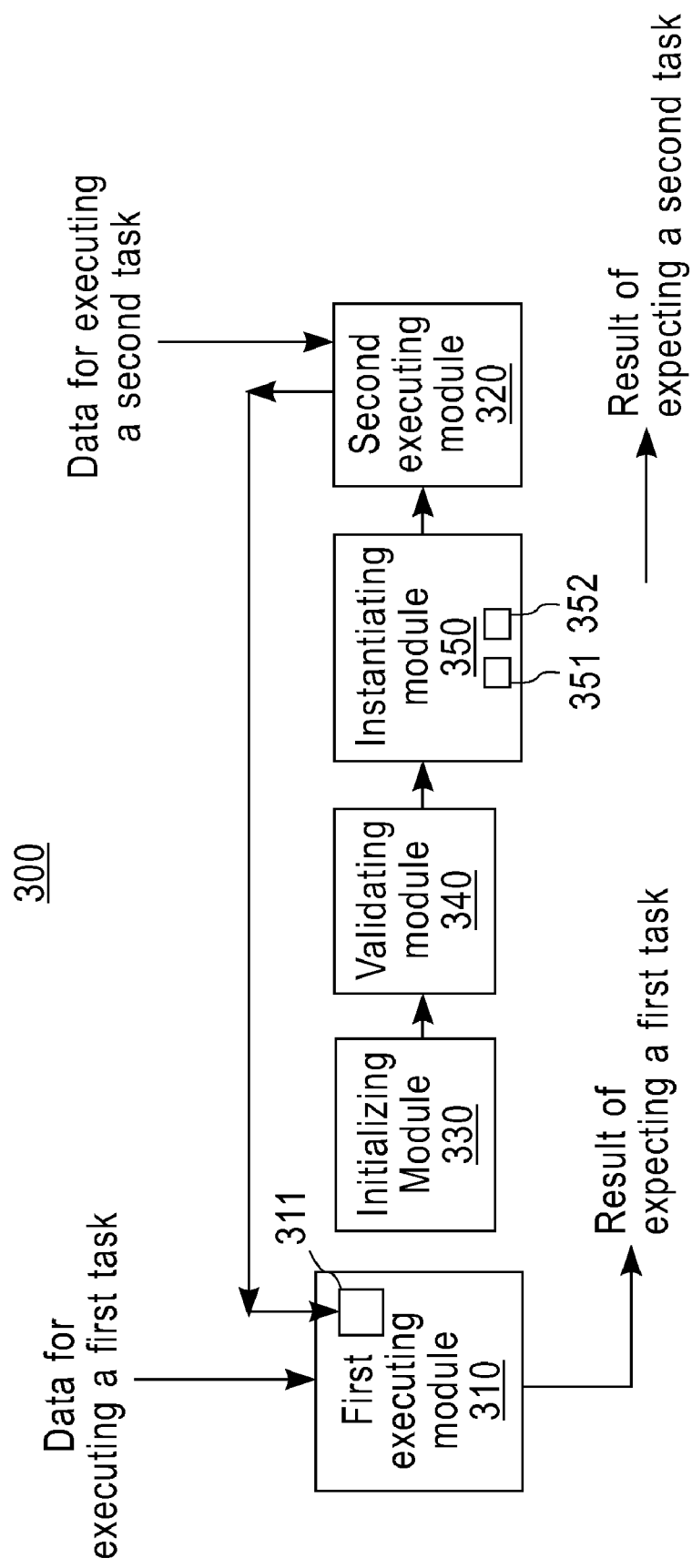
FIG. 3 illustrates a system 300 for executing a task according to an exemplary aspect of the present invention.

FIG. 3 illustrates a system 300 (e.g., a software implemented system) for executing a task (e.g., a low latency task), according to an exemplary aspect of the present invention. The system 300 includes a first executing module 310 for executing a first task in which garbage is collected using a garbage collector 311, and a second executing module 320 (e.g., a new programming construct) for executing a second task having a higher frequency than the first task, the garbage collector being preemptable (e.g., preempted) by the second task.

As illustrated in FIG. 3, the first executing module 310 may receive data for executing a first task and output a result of executing a first task, and the second executing module 320 may receive data for executing a second task and output a result of executing a second task.

The system 300 may also include an initializing module 330 for initializing the second task by constructing an instance of a class that implements a standard Java Runnable interface, and creating a data structure for supporting communication and synchronization between the second task and low-frequency threads, and a validating module 340 for validating the second task to ensure that the second task is executable without synchronizing with the first task, and an instantiating module 350 for instantiating the second task to create a class for the executing the second task.

Further, the instantiating module 350 may include a tracker 351 for tracking a set of objects which are accessible by the second task, and a pinner 352 for pinning the objects such that the objects are immovable by the first task.

Overview

While real-time garbage collection has achieved worst-case latencies on the order of a millisecond, this technology is approaching its practical limits. For tasks requiring extremely low latency, and especially periodic tasks with frequencies above 1 KHz, Java programmers must currently resort to the NoHeapRealtimeThread construct of the Real-Time Specification for Java. This technique requires expensive run-time checks, can result in unpredictable low-level exceptions, and inhibits communication with the rest of the garbage-collected application.

The present invention, on the other hand, includes a new programming construct that can arbitrarily preempt the garbage collector, and may guarantee safety and allow its data to be visible to the garbage-collected heap. The programming construct according to the present invention may be a strict subset of Java, and require no run-time memory access checks. Safety may be enforced using a data-sensitive analysis and simple run-time support with extremely low overhead.

The inventors have implemented the programming construct in a Java virtual machine, in experiments in which the construct was run at frequencies up to 22 KHz (a 45 μs period). Across 10 million periods, 99.997% of the executions ran within 10 µs of their deadline, compared to 99.999% of the executions of the equivalent program written in C.

Detailed Discussion

The present invention includes a programming construct (e.g., "Construct") for tasks that can arbitrarily preempt a garbage collector and yet may be comprised entirely of standard Java code without extra run-time memory access checks. This programming construct (e.g., the second executing module 310 in FIG. 3) according to the present invention may be simple to design, develop, and understand. The programming construct can also be terminated in the event of cost over-run without causing deadlocks or data structure corruption.

It should be noted that the inventors implemented an exemplary aspect of the present invention using a Construct which they named "Eventron". Thus, there may be referenced to the term Eventron herein. However, this term should in no way be considered limiting and, in fact, basically any term may be substituted for the term Eventron herein.

Specifically, other terms may be substituted for the term "Eventron" in the programming code discussed herein. Thus, for example, the Construct according to an exemplary aspect of the present invention may be entitled "Construct X" in which case the term "ConstructXReadChannelofShort" may be substituted for the term "EventronReadChannelOfShort" discussed herein, and so forth.

The new programming construct may be both more and less restrictive than NHRTs and Scopes. Allocation within the new programming construct may not be permitted, and neither may be modification of pointers. These restrictions may be enforced at validation time using a simple bytecode analysis. Once the Construct is validated, it may not throw any exceptions except those resulting from normal Java semantics such as array bounds checking.

The Construct may be less restrictive than Scopes because the construct's data structures can be accessed by normal Java threads running in the garbage collected heap. As a result, communication of data between high-frequency tasks, and lower frequency, garbage-collected tasks is greatly simplified.

Validation occurs at run-time, examining both the code and the data of the construct, but must be performed before the Construct may be scheduled. By choosing this intermediate point between fully static and fully dynamic checking, we are able to perform a simple analysis whose restrictions are easy for programmers to understand, and yet obtain a fairly precise call graph since it is based on a known set of previously instantiated objects. The separation of the program into an "initialization" and a "mission" phase is also natural to most real-time applications.

The Construct is well suited to tasks like sensor processing, in which sensor data must be sampled at a very high frequency, buffered, and then processed en masse by a lower-frequency task.

The Construct is also well-suited to simple high-frequency control loops that read a limited amount of data, perform some simple processing (such as FFTs) and then produce actuator control values. The ability to share data between high-and low-frequency tasks allows the use of more complex, dynamically allocated, garbage-collected data structures in the low-frequency tasks that make higher-level planning decisions requiring more complex processing.

The combination of the Construct for high-frequency tasks and real-time garbage collection for medium- to low-frequency tasks provides an integrated programming methodology that enables the use of heap-allocated data structures in even the most demanding real-time applications, and yet does not change the Java programming model in any fundamental way.

EXAMPLE

Music Generation

We begin with an example to illustrate the use of the Construct to implement an integrated real-time application. The example combines both low-and high-frequency tasks to generate and play back music without relying on the operating system or underlying hardware to buffer the output. A low-frequency task performs the computation necessary to compose a musical score and generate the raw audio data, while a high-frequency task sends the raw audio data to the unbuffered output device, one sample at a time. To provide seamless audio playback at the standard frequency of 22.05 KHz, the high-frequency task in this example must be run every 45 µs.

Implementing a Low-Frequency Task

FIG. 4 illustrates a program for executing a low-frequency task. This task generates the next note of a musical score, converts the note to an array of samples, and then writes the samples to a shared channel.

That is, the task in FIG. 4 may use a music composition library (not shown) to generate a musical score one note at a time. Each note is then converted to a set of samples and written to a shared channel. The low-frequency task (including any libraries it uses) may rely on a garbage collector to automatically manage memory; the code used to implement this task may only be constrained at the point where it interacts with the high-frequency task.

In this example, that interaction may be managed by an EventronReadChannelOfShort. This general purpose data structure may provide a form of impedance matching between the low-and high-frequency tasks and can be configured to hide the latency and jitter of the low-frequency task. While the code shown in FIG. 4 may allocate an array from which the raw audio samples are copied into the channel queue, the channel queue also provides a mechanism to avoid this copy.

Implementing a High-Frequency Task

FIG. 5 illustrates a program for a high-frequency task, according to an exemplary aspect of the present invention. This task may reads a single 16-bit sample from the shared channel and play it using an interface to the raw audio device.

The high-frequency task in FIG. 5 may be implemented using the Construct abstraction. During an iteration (e.g., each iteration), the task may read a single 16-bit sample from the shared channel and write that sample out to the audio device.

A number of constraints may be enforced on the Construct code during initialization using an on-line analysis. For example, note that reference fields may be declared final on lines 2-6. The inventors found that the use of final may be a natural and familiar way to ensure that the Construct data structure remains fixed over time.

The high-frequency task may use the non-blocking interface of the EventronChannel to read individual samples. This operation may return either a sample or a value indicating that the channel is empty or closed. Alternatively, programmers can avoid reserving special indicator values and instead use exceptions. However, all exceptions should (e.g., must) be preallocated, as also illustrated in the example.

This task in FIG. 5 also uses a native method (lines 9 and 19) to communicate with the audio playback device. Many applications of the Construct may require native methods to communicate with hardware. The Construct run-time takes steps to ensure the relative safety of Java native interface (JNI) code that is invoked by a Construct.

Notice that the high-frequency task does not necessarily contain a looping construct. Instead, the scheduler may invoke this task periodically as indicated during initialization. The Construct may continue to be invoked until it is explicitly removed from the scheduling queue (by some other thread), or when an exception is thrown from the Construct run( ) method.

Integrating Tasks

FIG. 6 illustrates a program for task integration, according to an exemplary aspect of the present invention. The two tasks may be instantiated, initialized with a shared channel queue, and the high-frequency task may be validated before being passed to the scheduler.

That is, FIG. 6 provides an example of integration of the low-and high-frequency tasks. On line 11 in FIG. 6, the programmer may instantiate a shared data structure which is the sole mechanism for interaction between the low-and high-frequency tasks. The low-frequency task may be scheduled on lines 18 and 19 by instantiating an ordinary Java thread.

Before the high-frequency task can be executed, it may be first be validated (line 16) to ensure that it can safely preempt the collector. While validation may fail and cause a checked exception to be thrown in the main( ) method, memory access checks are not necessarily performed while executing the Construct.

Thus errors may occur during the initialization phase of the application instead of during the execution of the Construct itself. This is a natural time to detect any problems in the configuration of the Construct, as the application should also ensure that any required hardware is properly configured and that sufficient resources are available to run the Construct.

Validation may also cause the run-time system to pin down any data structures accessible by the Construct: these objects may not be collected or even moved to another location in the heap while the Construct is active. However, once the Construct is disabled, these objects can be moved and, if they are otherwise unreachable, reclaimed.

The Life and Times of the Construct

Figure 7:
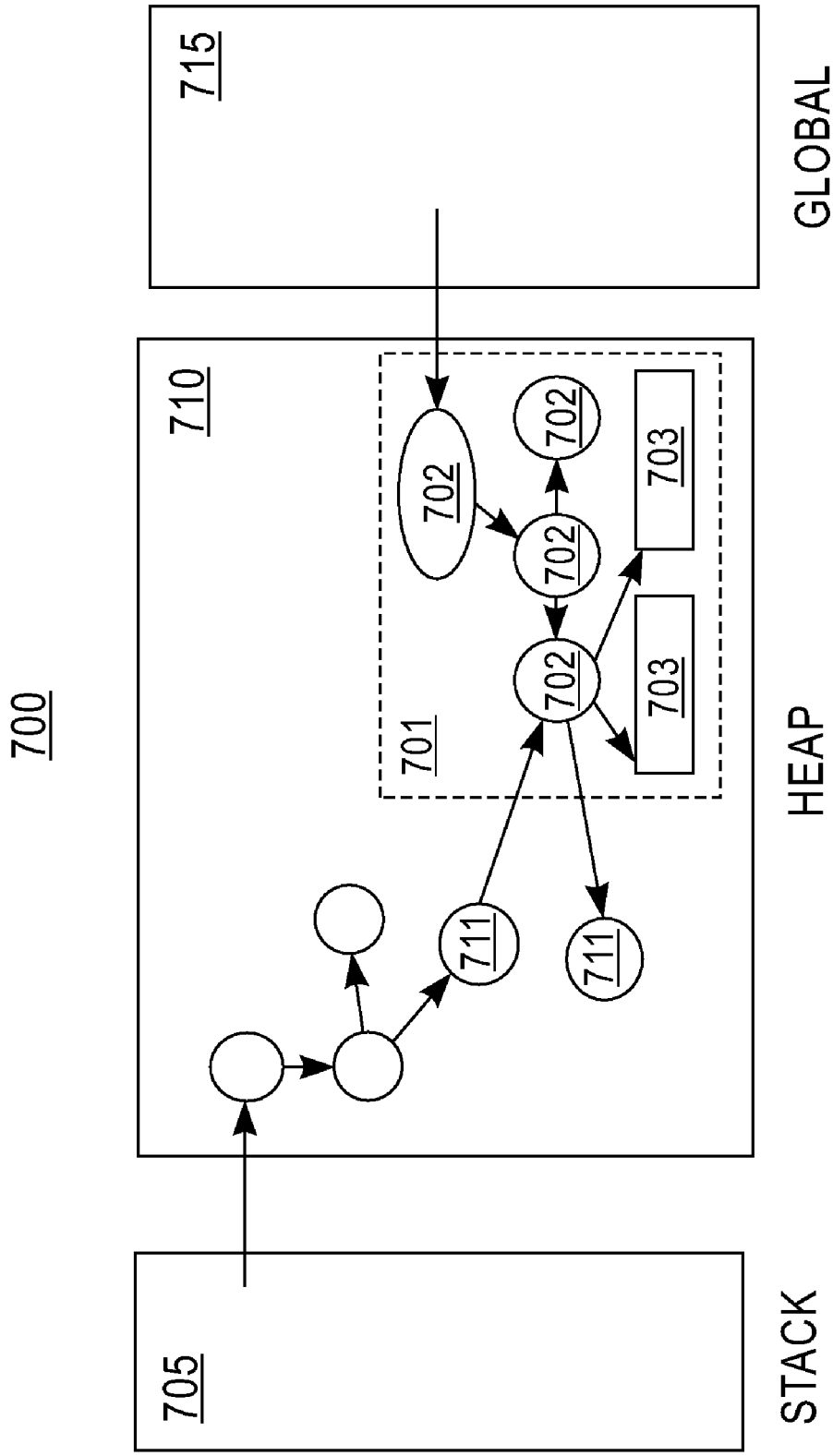
FIG. 7 illustrates a system 700 for executing a task according to an exemplary aspect of the present invention; according to an exemplary aspect of the present invention.

FIG. 7 provides an example of a system 700 (e.g., a software-implemented system) in which the Construct 701 may interact with the heap 710, according to an exemplary aspect of the present invention. In addition, the heap 710 may be accessible by the stack 705 and global 715. Further, the Construct 701 may include buffers 703 which may store values in the construct, to provide efficient access to the values.

Objects 702 associated with a Construct 701 may reside in the garbage-collected heap 710 but may be pinned for the life of the Construct. The objects 702 may be referenced by other heap objects 711, and may be subject to garbage collection once the Construct 701 terminates.

The Construct 701 may defined by a set of Java methods that may be executed as a high-frequency task, the data structures manipulated by those methods, and a thread that will execute them. In the present invention, Constructs 701 can safely preempt the virtual machine, and in particular the garbage collector, at any point by eliminating any synchronization between Constructs 701 and the collector.

First, it is ensured that the Constructs 701 cannot change the reachability of any object managed by the collector. While this condition might be enforced by additional run-time checks, the present invention may instead impose constraints on the code and data structures defining a Construct 701 that can be verified before the Construct 701 is executed. These constraints ensure that the set of objects accessible to a Construct 701 is fixed for the duration of its execution, while allowing objects used by a Construct 701 to be accessed by ordinary Java threads. These constraints may be enforced using a run-time static analysis: an analysis of the Construct bytecode may be performed while the program is executing, but before the Construct itself is invoked. This may allow an efficient and precise analysis.

Secondly, the need for synchronization between the garbage collector and a Construct 701 may be eliminated by precluding any collector operations that, if preempted by a Construct 701, might expose the heap 710 in an inconsistent state. Specifically, objects accessible to a Construct 701 may be pinned. Thus, the collector may never be interrupted while moving one of the Construct's objects.

The lifetime of a Construct 701 may be split into five phases. First, a Construct 701 may be initialized in the same way an ordinary Java structure is constructed. During the second phase, validation, the present invention may verify that the Construct 701 code can safely preempt the collector and discover (e.g., simultaneously discover) the set of objects that should be pinned.

The third phase is instantiation, in which the Construct's data structure may be pinned and an executable thread may be created. The fourth phase is execution, during which the Construct 701 may be invoked one or more times, either at specific times, with a predetermined period, or in response to certain external events. Finally, a Construct may be destroyed, at which point the objects in its data structure may be unpinned and eventually garbage collected, unless the objects are reachable from the heap 710 or other Constructs 701.

Initialization

To create a Construct, the programmer may construct an instance of a class that implements the standard Java Runnable interface. This object may form the root of the Construct data structure, and its run( ) method may form the entrypoint for the execution of the Construct.

The programmer may also build the data structures necessary to support communication and synchronization between the Construct and low-frequency threads. Typically, this may involve the use of one or more channels.

Validation

During the validation phase, the present invention may ensure that a Construct may be safely executed without synchronizing with the garbage collector (i.e., the collector). Validation may take place while the application is running but before the Construct is invoked. This may allow the validation process to take advantage of information that is present at run-time and to detect potentially misbehaving code while the task is being set up rather than during the execution of the Construct itself.

Validation should (e.g., must) ensure three features of the Construct code: first, that th Construct code does not allocate any memory, second, that the Construct code does not perform any blocking operations, and third, that the extent of the heap that it accesses remains fixed.

These restrictions may be enforced by creating a data-specific call graph for the particular Construct being validated, and performing a set of checks on the bytecodes of the resulting methods. This process can be viewed as a kind of partial evaluation.

Enforcement of Restrictions

FIGS. 5A and 5B provides a list of operations that may be illegal in Construct code. Specifically, FIG. 5A provides a table which includes illegal bytecodes in Construct code and FIG. 5B provides a list of illegal method invocations in Construct code.

Operations that may be illegal within a Construct are summarized in FIG. 5A. When any of these operations are encountered, a ConstructValidationException is thrown reporting the source code location of the offending instruction.

As shown in FIG. 5A, bytecodes (e.g., all bycodes) that perform allocation may be prohibited, as well as bytecodes that perform synchronization either explicitly (via monitor bytecodes) or implicitly (via synchronized methods). As further shown in FIG. 5B, reflective access to such operations may also be prohibited, as is the use of the wait and notify methods of Object (which would necessarily generate exceptions since the Construct thread is never able to enter a monitor).

The last group of restrictions in FIG. 5A may ensures that Constructs neither read nor update mutable heap references. Writes to object fields, static variables, and array elements may only be permitted for primitive types. Reads are permitted for non-primitive types, but only if the field is declared final.

There are at least two complications with respect to final fields: first, Java does not provide any mechanism to specify the immutability of array elements. To this end, the present invention may provide a special class, ImmutableArray<T>, which stores an array of immutable references to objects of class T.

An ImmutableArray may be initialized by passing it an array of references, which is copied into a private instance array of the ImmutableArray object. The only methods provided are get(index) and length( ). Since the finality of the array elements within an ImmutableArray is enforced programmatically, the validator allows their use within a Construct.

The reflective analogues may get and set of the proscribed pointer-accessing bytecodes may also be prohibited. Note that unlike the byte-code operations, the reflective operations may be more restricted, since at validation time the fields or methods being accessed may not be known. In particular, neither reflective access to final pointer fields nor reflective method invocation may be permitted within a Construct.

The second complication with respect to finality has to do with exposure of incompletely constructed objects. This problem may be solved in the present invention by using a simple run-time assisted mechanism.

In practice, the inventors found that rejecting all methods that perform allocation may inhibit the reuse of some existing library methods inside the Construct. This is often due to the common Java idiom of allocating exception objects ("throw new FooException"). In many cases, the programmer knows that the offending code will never be executed but the validator conservatively assumes otherwise. An optional feature of the validator allows programmers to exempt certain methods from the normal check for allocating bytecodes. To keep this feature from compromising safety, the run-time allocator may throw an immediate OutOfMemoryError whenever an allocation occurs on a Construct thread.

Data-Sensitive Call Graph Analysis

The validator's analysis may explore the set of reachable methods and the set of reachable objects (e.g., simultaneously), letting each set inform the other. Rather than build a complete call graph, the validator may analyze only those methods that could be invoked given the set of objects reachable by the Construct. In the course of its analysis, the validator may conservatively determine sets of objects O, field signatures F, methods M, and virtual method signatures V reachable to the Construct. These are the structures which may be accessed by the Construct during its execution.

Initially, O may contain only the object implementing the Runnable interface, and the only method in M is its run ( ) method. For each method added to the call graph, the validator may consider each byte-code instruction of that method in turn. Note that each method may be analyzed at most one time, and therefore the validator may terminate in time linear in the size of the program and the size of the heap.

getfield—The signature of target field f is added to the validation set F. In addition, the validator may consider every object in O that defines a field matching that signature. For every such object, the validator may use reflection to determine the referent of its field f, this referent may then added to O.

As objects are added to O, each one should (e.g., must) be inspected for fields that are already found in F, and the referents of these fields should be added to O. Therefore, in the course of processing a single getfield instruction, only one field signature may be added to F, but many objects may be added to O.

getstatic—The validator may add (e.g., immediately add) the referent of the static field to O. Any fields of the referent that appear in F are considered as above.

invokestatic, invokespecial—For method invocations whose targets can be statically determined, the validator may add the target method to M.

invokeinterface, invokevirtual—For virtual method invocations, the signature of the target method may be added to V. The validator may then consider each object in O implementing that signature. For each such object, its implementation may be added to M and subsequently validated.

Just as the fields of objects added to O may (e.g., must) be compared to the signatures in F, the methods of those objects may (e.g., must) be compared to the signatures in V. That is, for an object (e.g., each object) added to O, and for a method (e.g., each method) m of that object, if m matches a signature in V, then m may be added to M.

Finally, the restrictions described above may be enforced as the method (e.g., each method) is processed. If a prohibited bytecode instruction or method invocation appears in an analyzed method body, the analysis may terminate immediately, throwing an exception that indicates where the offending code can be found.

If the validation succeeds, the objects in O may be those that may be accessed by the Construct and therefore should (e.g., must) be pinned.

Recall that any reference field (instance or static) accessed by a Construct may (e.g., must) be declared final. This restriction may be used not only to ensure that synchronization with the collector can be safely omitted, it may also be helpful (e.g., necessary) for the soundness of the above analysis. Without this restriction, the validator may not be able to safely assume which objects may occupy a given field or which implementations of a given method signature might be invoked.

Because the present invention may require only those fields that might be referenced by a Construct to be declared final, some reference fields in the Construct data structure may not be final. As a result, pinned objects may hold (mutable) references to unpinned objects, as shown in FIG. 7. This is safe since the inventors' analysis has shown that these fields may not be accessed by the Construct.

Data-Sensitive Analysis Versus Other Analyses

Note that the analysis utilized by the present invention may be neither flow-sensitive nor context-sensitive. It may be however, data-sensitive: the call graph may be constructed for the invocation of the run ( ) method of a particular concrete Construct instance. In general, flow-and context-sensitivity can increase the precision of call graph analysis. However, even fairly aggressive algorithms still make some conservative approximations, especially about the contents of instance fields, which can induce imprecision in the call graph.

JIT compilers may often compensate for the imprecision of static call graph construction algorithms by exploiting profile data, online class hierarchy analysis, and other optimistic and speculative optimizations. This often works well in practice, but if the assumption turns out to be invalid, the code may need to be (e.g., must be) recompiled (an operation that may not necessarily mesh well with real-time execution).

In principle, a data-sensitive analysis may be more or less precise than any of the above techniques, depending on the particular class hierarchies, call graphs, and execution orders. However, the inventors believe that a data-sensitive analysis may often yield the most precise result in practice.

Regardless of the precision, however, there is at least one more compelling reason to use data-sensitive analysis: it may be simple enough that it can be easily described to a programmer. More complex analyses are easily perturbed by small changes in the code, and a seemingly trivial change can cause two variables to become possibly aliased.

The analysis used by the present invention may avoid this form of speculation and rely on two forms of information which may be specified (e.g., specified directly) by the user: the object graph and the use of final fields. In contrast to other analyses, the data-sensitive analysis in the exemplary aspects of the present invention may use mechanisms that may be familiar to Java programmers and may yield an induced call graph that may be quite stable in the face of changes to the program.

Implementation

The present invention may implement the validation phase using a combination of standard Java reflection (to explore the graph of reachable objects) and specialized VM-specific code to consult the bytecodes and constant pool of already loaded and validated classes (validation may (e.g., must) run against the in-memory classes to prevent security attacks that change the class files).

It may be straightforward to implement the same validation algorithm using a class file inspection package, with or without a static analysis framework (for example, an earlier prototype used the Domo program analysis library). However, such a validator may only be safe to use for development-time exploration of Construct validity. A run-time validator may (e.g., must) ensure that it is working with the actual bytecodes that have been loaded into the running VM.

Preventing Violations of Finality

To help ensure complete safety of Construct execution, some additional checks may be required for code that executes outside of the Construct threads.

Exposure of Incompletely Constructed Objects

Unfortunately, simply using final may not guarantee that heap structures will be immutable. A constructor may expose the pointer before the constructor's fields are completely initialized, for instance by storing this into a static field. If a partially constructed object is present in a Construct data structure, the validator may see a final field as null even though it will be subsequently initialized to a non-null value. In this case, the validator may have based its analysis on incomplete information, and the safety of the Construct could be compromised.

Attempts to prevent such operations via static analyses tend to be grossly over-conservative because the targets of virtual calls are not available.

An exemplary aspect of the present invention, however, provides a solution which may include adding a "fully constructed" flag to the header of an object (e.g., every object). The interpreter may set this flag as a constructor returns (the return of any constructor for a given class is sufficient to guarantee that final fields of that class and its superclasses are initialized). The present invention may provide a run-time interface allowing the flag to be queried, and the validator may throw an exception whenever it encounters an object for which this flag is not set. This may result in a simple programming model and an efficient implementation.

The specification to the programmer may be simple: all Construct objects must be completely constructed.

Reflection and JNI

It may also be possible to undermine the restrictions of final using reflection. The method invocation restrictions on Construct code (FIG. 8B) may already rule out any reflective access to pointers in the Construct data structure from the Construct itself. However, other threads may have full access to reflection, and in Java 1.5, reflection may even allow the modification of final fields (!) after a call to setAccessible ( ).

According to the specification, this functionality may only be intended to be used during deserialization and other uses may have "unpredictable effects." However, any violation of finality may render Constructs unsafe, which the inventors do not consider to be an acceptable "unpredictable effect," so this should be prevented.

In an exemplary aspect of the present invention, a preferred approach to this problem may include modifying the Field.set ( ) implementation of java.lang.reflect to check whether the field being set is a final field of an object pinned by a Construct. In that case, a run-time exception may be thrown. Similarly, Array.set ( ) can be modified to prevent reflective modification of pointers inside the arrays that implement the ImmutableArray class.

Restrictions on reflective field access should not cause runtime exceptions in code that uses the interface as intended, since Construct data structures may be constructed before validation, and so by definition are not necessarily being de-serialized.

Similar to reflection, JNI code can circumvent Construct restrictions and violate validation assumptions. For example, native code can execute Java methods that were not part of the validation-time call graph, read and write reference fields that the validator did not know were to be read or written, enter monitors, or allocate objects. Despite this, many Constructs must use native code to interface with hardware devices.

One could argue that JNI code is inherently unsafe since it is capable of directly modifying any word in memory (indeed, no JNI access control restrictions are enforced in the Java programming language as a deliberate design decision). However, the inventors judged that JNI code that was completely safe to execute in other contexts ought not to produce arbitrary results simply because it was invoked by a Construct.

The present invention may catch native code violations with inexpensive dynamic checks in those JNI helper functions that should not be called by Constructs. Each helper function that would be unsafe to execute on a Construct thread may immediately throw an exception if executed on a Construct thread. This allows problems to be caught early in the testing phase (albeit not necessarily at validation time).

Instantiation

Once a Construct has been validated, it should (e.g., must) be instantiated. This may involve (e.g., requires) either creating an executable thread that will invoke the Construct repeatedly at high frequency, or associating the Construct with an interrupt handler. In either case, the run-time system should (e.g., must) also track the set of objects accessible to the Construct and pin these objects so that they are not moved by the garbage collector.

The set of Construct-reachable objects may be created during the validation phase (to avoid redundant object traversals) and may be now installed into the run-time data structures. This set may be external to the Construct itself and persist until the Construct is destroyed.

Pinning of Construct Objects

For Constructs to work properly in conjunction with a collector that moves objects (whether or not the collector is incremental), the objects should (e.g., must) be pinned before the Construct is allowed to execute.

FIG. 9 illustrates how Interfaces to run-time support operations may be added to the virtual machine to support the Constructs (e.g., Eventrons).

There are various collector architectures that move objects, among them page-based defragmenting collectors, generational collectors, and semi-space copying collectors, as well as their concurrent variants (although the present invention is not necessarily limited to any particular type of garbage collector). There are also various approaches to pinning objects suited to the different kinds of collector architectures. For instance, in a generational collector, objects should not be pinned in the nursery, so a nursery evacuation should be forced as part of the Construct instantiation procedure.

The present invention is described herein based on the design used in the inventors' actual implementation that runs together with the Metronome collector, a real-time incremental collector that organizes memory into page-based segregated free lists (although the present invention is not limited thereto). Defragmentation may be performed on an as-needed basis and compact objects within a size class.

To minimize changes to the Java run-time system, the inventors' chose to implement the run-time support for Constructs in Java whenever possible. One exception includes support for pinning objects. In an exemplary aspect, the inventors extended the interface to the run-time system with the functions shown in FIG. 9.

Invoking pinObjects may prevent the objects from being moved by the collector. Invoking unpinObjects may revert this state change. Only the Construct run-time support code may have access to the pinning and unpinning methods. The native support may be wrapped by Java code that aggregates pinning information from multiple Constructs. These native methods may be called (e.g., are only called) with collections of objects the first time those objects are used by a Construct or once all Constructs using those objects have terminated.

This interface may be similar to the Create/DestroyGlobalRef functions found in the Java Native Interface. While those functions may ensure that a given object will not be freed, they do not necessarily guarantee that the referent will not be relocated by the collector. Though no standard support for pinned objects may exist in Java, several other languages may already provide similar functionality. For example, the above interface can be easily implemented using existing run-time support in either the Common Language Runtime or the Haskell Foreign Function Interface.

Since Metronome uses a page-based memory architecture, the implementation in an exemplary aspect of the present invention of pinning may maintain a count of the number of pin operations applied to the objects of each page. At instantiation time, pinObjects ( ) may be invoked with the set of objects that are accessible to the Construct but that are not already pinned. Since pinning may be atomic with respect to interleavings with the garbage collector, once the entire data structure has been pinned, it may be guaranteed that the collector will not move any of the objects.

Compensating for Races with Compaction

However, this does not necessarily guarantee collector independence: there may be pointers among the objects that were pinned early in this stage that refer to objects that were later pinned but moved by the collector in the intervening time. Thus, there may be stale pointers in the Construct data structure. For the garbage-collected heap, this may not be a problem since those pointers will be fixed during the subsequent tracing phase of the collector before the old versions of objects are reaped.

Unlike ordinary Java threads, the Construct's stack is not necessarily scanned to identify roots or fix stale pointers once it begins execution. Thus, a Construct could potentially load a stale pointer into a stack variable and dereference it after the old object (with its forwarding pointer) had been reaped by the collector and re-allocated.

This problem may be addressed by performing a second iteration over the Construct objects after pinning is completed. The two-phase nature of object pinning and forwarding may be part of the implementation of pinObjects. The second iteration may check whether any pointers in the object are stale and immediately update them to the forwarded copy of the referent.

This second pass may guarantee that no stale pointers remain in any Construct object. After this point, no Construct object may be moved by the collector nor may any Construct object contain pointers that will be modified by the collector. Therefore, the Construct stack may never contain stale references and does not need to be examined, and at no point in the Construct's execution should (e.g., must) it synchronize with the collector.

Once all Construct objects are pinned and their pointers are forwarded, a Construct thread may be created. The run-time may ensure that becomeEventronThread is invoked for each Construct so that it may be distinguished from ordinary Java threads.

Execution

Thread Priorities

Once a Construct is released, it may arbitrarily preempt the garbage collector. Constructs by default may be created with a priority just higher than the thread that schedules the garbage collector (which itself may run at a priority just higher than the collector threads themselves).

Construct priorities may be set to any value allowed by the underlying system. Constructs may co-exist with RTSJ NoHeapRealTimeThreads, and their relative scheduling may be handled by the operating system based on their respective priorities.

Distinguishing Construct Threads

Construct threads should (e.g., must) not yield to garbage collection threads at the beginning of each collector quantum. Therefore, an exemplary aspect of the present invention may distinguish Construct threads using a flag in a thread-specific data structure. This flag may be used by the run-time scheduler to determine which threads must reach a safe point before a collection quantum can begin. In addition, as the collector is scanning the stack of each application thread, it should (e.g., must) ignore the stacks of Construct threads since these threads are not necessarily at safe points.

Because the stacks of Construct threads are not necessarily scanned during collection, it should (e.g, must) be ensured that any object accessible to a Construct is also reachable from some other root. The set of pinned objects associated with each Construct may serve to maintain this invariant: each set of pinned objects may be added to a global table for the duration of the execution of the Construct.

Construct threads may share some characteristics with NoHeapRealtimeThreads, for example, neither may be suspended during the execution of the collector. However, these two types of threads may be distinguished, as Constructs are not necessarily subject to the same checks on heap access.

Run-Time Exceptions

While the inventors' analysis may rule out any allocation that may occur because of code intentionally written by the programmer, the present invention may allow the programmer to relax this restriction for code included from libraries, meaning that unanticipated allocations may occur, causing an immediate OutOfMemoryError. In addition, the system may perform allocation while handling an exceptional condition that arises during normal execution (e.g., NullPointerException).

The inventors found it impractical to change all of the code paths involved, and typically the run-time does much more than allocate an exception object (e.g., it also allocates a string of message text). In an exemplary aspect (e.g., the inventors' implementation), these allocations may also cause an immediate OutOfMemoryError. Despite this, the inventors' implementation may ensure that all such exceptions contain valid traceback information, which simplifies debugging.

Exceptions may be caught by a Construct, including both those exceptions that are preallocated and those that arise from allocation. Unhandled exceptions may result in the termination of the execution phase. The Construct may (e.g., will) not be re-run until it is explicitly rescheduled.

Termination

Once a Construct has run its course, either after it has been disabled by a call from another thread, or because it threw or failed to catch an exception, its data structures may be unpinned and the Construct thread may revert to the ordinary state for a brief interval before terminating. During this brief interval, the Construct thread may store into reference fields, and this may explain how exceptions thrown during the execution phase may be preserved for inspection by other threads.

When a Construct is destroyed, the destruction routine may unpin the associated data structure, so that Construct objects that remain live due to pointers from the mutable heap may be no longer pinned, and there may be no "pinning leak."

Killing, Restarting, and Cost Enforcement

Since Constructs do not necessarily modify pointer structures and do not necessarily hold locks (because all operations should (e.g., must) be non-blocking), it should be possible to terminate a Construct at any instruction without negative effects on the rest of the system.

This avoids another major problem with other approaches to high-frequency tasks in Java, namely that they may hold resources which may make the semantics of early termination poorly defined.

The only circumstance under which killing Constructs is unsafe may be when the program is using a custom synchronization protocol in which the Construct might expose partially updated state non-atomically. However, as long as the channel abstractions are used this should (e.g., will) not happen.

This capability can be used to implement either asynchronous termination of the entire Construct or of one particular execution. This may mesh well with cost enforcement, since it may allow the early termination of an iteration that misses its deadline, and may immediately reset it to a state in which it can handle the next event in a timely fashion.

Construct Channels

To aid programmers in transferring data between tasks of different priorities and frequencies, an exemplary aspect of the present invention may provide an implementation of wait-free, allocation-free channels. These channels may allow data to be streamed to and from Construct tasks. Though the inventors intended that EventronChannels may be common utility classes, they may still be checked by the validation process described above.

An exemplary aspect of the present invention may also provide the lower level Notifier object (discussed below as part of the implementation of EventronChannels). The Notifier, along with the properties of the Java memory model and/or the facilities of the java.util.concurrent.atomic package, can be used to implement other wait-free utilities.

EventronChannels should (e.g., must) be wait-free to avoid priority inversion. An exemplary aspect of the present invention may provide two versions of the channel abstraction: one that provides wait-free access to the reader and a blocking interface to the writer (called a EventronReadChannel) and another that provides a symmetric interface (EventronWriteChannel). (The present invention may also provide wait-free access for the low-priority half of these channels.) This may allow for relatively straightforward implementations of both high-and low-frequency tasks: high-frequency tasks may be driven by the scheduler, and if they avoid looping and use only wait-free structures such as ConstructChannels, they should have predictable execution times. Low-frequency tasks can be designed to produce or process data as quickly as possible and can rely on the channel to throttle their execution.

Channels should (e.g., must) also be free of allocation and pointer mutation to avoid synchronization with the collector. Like other Construct data structures, they should (e.g., must) perform all allocation during initialization. An exemplary aspect of the present invention may specialize EventronChannels for the single reader/single writer case to allow efficient implementation in the context of these constraints.

Each EventronChannel may provide a wait-free communication mechanism by implementing a circular queue or ring of primitive values. These values may be grouped together into buffers to provide more efficient access. EventronChannels may come in seven "flavors," one for each of the each of the primitive Java types.

Programming Interface

At their core, ConstructChannels may be similar to input and output streams, providing methods to read and write individual elements and arrays of them. In the most basic interface, reading (respectively, writing) an array of values may cause the elements of the array to be copied from (respectively, to) the internal data structure.

However, the present invention may also offer a slightly more complex, but lower overhead, alternative. A reader or writer may also acquire access to the internal buffer array. This may allow data to be transferred between (e.g., directly between) tasks without any additional copies. Programmers should (e.g., must) be careful to relinquish references (e.g., all references) to a buffer once it has been released for use by the other task. Failure to do so may lead to unexpected values being read from the channel.

In many applications, when a channel overrun or underrun occurs, the high-frequency task should (e.g., must) continue to execute either by discarding data (in the former case) or using a default value (in the latter), while the error itself should be handled by some other task. EventronChannels may provide a mechanism to automatically communicate these exceptional conditions back to the low-frequency task: a subsequent write (read) performed by the low-frequency task may throw an UnderrunException (OverrunException).

Configuration

Two important (e.g., the most important) channel configuration parameters include the number of buffers and the size of each buffer. By dividing the channel storage into a fixed set of buffers, the present invention may allow the programmer to control the rate of synchronization between the reader and the writer. Each buffer may be owned by at most one of the two processes, allowing efficient access in the common case.

Only when moving from one buffer to the next may atomic memory accesses (e.g., compare-and-swap) be required. The size and number of buffers should (e.g., must) be determined given the relative jitter of the two tasks. The size of each buffer may determine the minimum latency between when values are written to and read from the channel, and the number of buffers may determine the maximum such latency.

In the audio playback example, a primary source of latency for the low-frequency task is the garbage collector. Suppose in this example that one is able to guarantee a maximum pause time of 5 ms and a minimum mutator utilization of 50% over any 10 ms window. Then, the proper configuration may include three buffers each containing 5 ms of data or, equivalently, 111 samples (recall that our example uses 22.05 kHz audio).

Initially the (low-frequency) writer may (e.g., will) be 10 ms ahead of the reader, but due to interruptions by the garbage collector, it may lag behind to the point where it is only 5 ms ahead. Such a scenario may (e.g., will) only occur if the collector has consumed a significant portion of the previous scheduling quanta: by the present invention's minimum utilization guarantee, the collector may (e.g., will) consume less of the subsequent quanta and allow the synthesizer to speed ahead once again.

The EventronWriteChannel may have one additional configuration parameter. In the case of an overrun, some data will be lost: either the oldest data should (e.g., must) be overwritten, or the newest should (e.g., must) be discarded. An exemplary aspect of the presen invention (e.g., the inventors' implementation) may support both, leaving the programmer to determine which is most appropriate for a given application.

Implementation

Each EventronChannel may be implemented using an ImmutableArray of BufferState objects, where such objects may encapsulate a buffer and an integer state variable. The state of each buffer may determine both the state of the content (whether the buffer contains data or not) and who owns the buffer. For example, a buffer (e.g., each buffer) in a EventronReadChannel may be empty, full, reading, or writing, the last two indicating ownership by the reader or writer, respectively.

There may be two additional states, underrun and closed, that may be used to communicate changes in the status of the channel as a whole. When an underrun occurs, the reader may wrest ownership of the current buffer from the writer, setting its state to underrun. The next access by the writer may (e.g., will) discover the state change and throw exception. Analogously, the writer may indicate the end of the data stream by setting the state of its current buffer to closed.

EventronChannels may depend on atomic operations provided by the java.util.concurrent.atomic package. Atomic compare-and-swap operations may be used to update the state of each buffer. For example, an underrun may occur at the same moment that the writer finishes writing to a buffer. Both tasks may attempt to update the state of this buffer (to underrun and full, respectively). An atomic update may ensure that both tasks agree on the winner of the race.

Further, the implementation of channels may require a mechanism to allow the high-frequency task to notify the low-frequency one when a buffer becomes available. The standard Java lock-notify-unlock may be unsuitable and while the implementation of locks in java.util.concurrent. locks may nclude tryLock and signal operations that avoid synchronization, they may not perform allocation and pointer mutation, rendering them unusable by Constructs. (This is partly because these locks may support an unbounded number of waiters.) Instead, an exemplary aspect of the present invention may provide a Notifier class that wraps any Object. That is, an exemplary aspect of the present invention may provide a notifyIfWaiting method, implemented internally to the virtual machine, which notifies threads (if any) waiting on the wrapped object's lock without blocking, allocating, or updating any reference field.

Evaluation

The present inventors have tested the performance of both validation and execution of Constructs, in particular comparing them to equivalent C programs and evaluating the interference from other (garbage collected) JVM threads.

All experiments were run on an IBM Intellistation Z Pro with 2 Pentium 4 Xeon processors (at 2.4 GHz and with 2-way hyperthreading) and 2 GB of physical memory. The operating system is Linux with the 2.6.14 kernel. Additionally, various patches to improve real-time performance were applied including high-resolution timers (HRT) and robust mutexes for priority inheritance.

The base for the implementation is IBM's Real-Time edition of the J9 virtual machine, which includes the Metronome garbage collector, RTSJ, and an ahead-of-time compiler. The language level is 1.5 (with generics) using the J2SE libraries.

The inventors' prototype implementation of Constructs included the "fully constructed" check and safety checks for reflective field updates. Although, in the inventor's experiments the aspects of the Construct prototype were not integrated into the production VM used to gather the results reported below, based on earlier experiments with the prototype implementation, the inventors do not believe this materially impacts the results reported below.

All Constructs were run at 22.05 KHz (a 45.35 µs period), a standard frequency for digital audio. Tests were run until 10,000,000 samples were obtained. These runs were sufficiently large to encompass periodic operating system activity which could perturb the results and to provide a statistically meaningful comparison. For example, the operating system flushes data to the disk every 30 seconds and performs timer interrupts every 1 millisecond.

Validation

FIG. 10 provides Table 1 which includes Validation times for several exemplary Constructs. The Null Construct has a trivial run( ) method, Audible is the music generation example, and FFT computes a fast Fourier transform.

The inventors measured the time required to validate this small set of exemplary Contructs. Table 1 shows the size of these examples and the time required to validate them. Each example includes any library code that may be executed by the Construct, for example, some methods of EventronRead-ChannelOfShort in the Audible example. While these validation times are much longer than the execution of the Constructs themselves, validation must only be performed once per instantiation of a Construct.

Base Performance: Constructs versus C

To establish the base timeliness results of Constructs, we implemented a C program which uses the same OS function calls to establish a periodic task of the same 22.05 KHz frequency. Other than computation to establish the scheduling behavior, neither version performs any work. The inventors measured the timeliness of both versions by measuring the interarrival times of the Construct and C handler.

Figure 11:
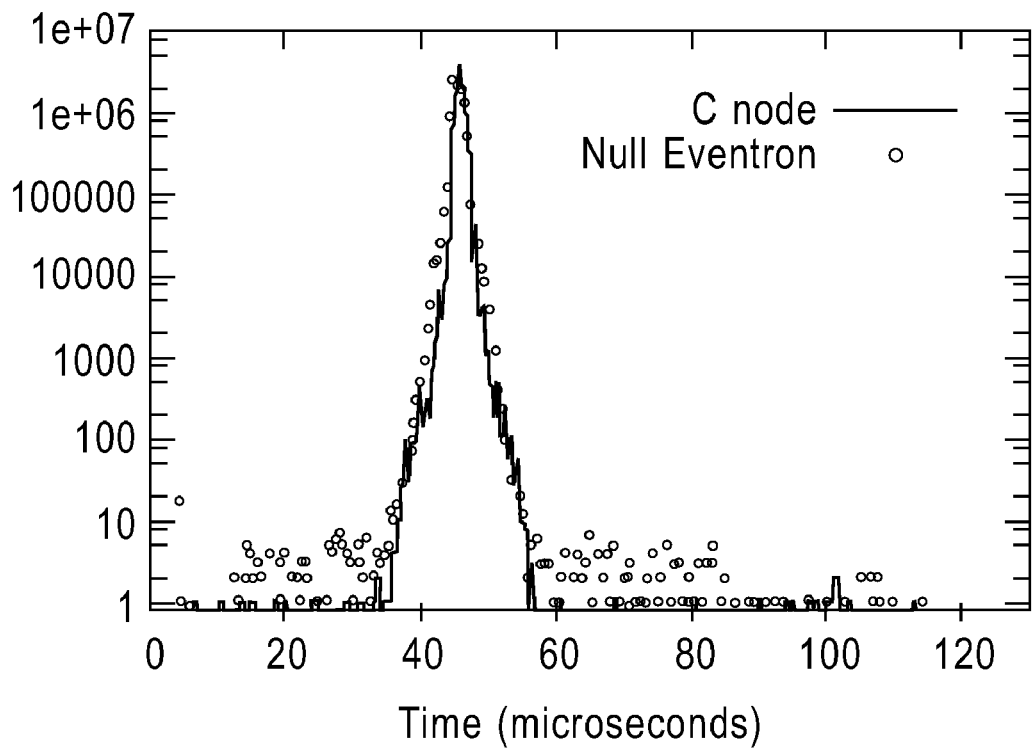
FIGS. 11-14 provide histogram plots which present the results from experiments conducted by the inventors.

Noting that the y-axis is logarithmic, FIG. 11 shows that nearly all of the data is centered tightly around the target period time of 45.3 µs. More precisely, 99.64% of the samples lie within 5 µs of the target time. Within 10 µs of the target time, Constructs include 99.997% of the data while C includes 99.999% of the samples.

Both the C version and the Construct versions have nearly the same distribution, both in terms of the extent and count of both the outlier clusters and the main region. This curve represents the degree to which this particular version of Linux is real-time and represents the best we can achieve from user-level code.

In this graph, the histogram's x-axis ends at 120 µs although there is one additional group of outliers centered at 4.0 ms. In fact, all runs, regardless of whether it is C or Constructs, which version of Constructs, and the load under which it is run, suffer from the same effect. Thus, the inventors believe that the effect stems from the operating system effect such as sync-ing the disk. In this particular figure, the C version has 12 outliers ranging from 3.93 to 4.06 ms while the Construct version has 7 outliers ranging from 3.99 to 4.05 ms. This 4.0 ms effect is pervasive and stems from the operating system.

Timeliness in the Presence of GC

Having established that Constructs can potentially achieve latency similar to that of a C application, we now test the main design feature of Constructs by measuring the effect that garbage collection has on Construct interarrival times. To do this, the Construct was run together with a lower-priority Java thread that continually allocates, thus triggering periodic garbage collections. The Construct's scheduling is potentially affected by both the mutator thread and the garbage collection thread.

Figure 12:
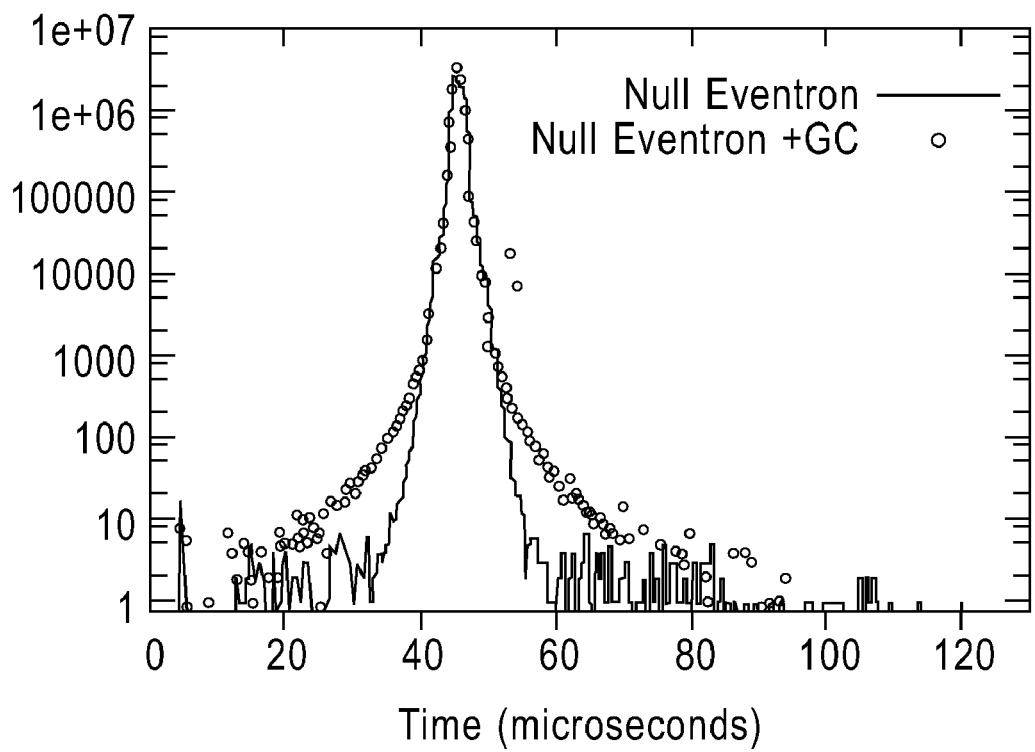

As seen in FIG. 12, these two effects combine to slightly worsen the behavior of the Construct. The distribution is not as tight as before so that at 10 µs, 99.990% of the data is included. However, nearly all of the distribution lies within 25 µs of the target time. In fact, the tail of the distribution is better when the mutator thread and the garbage collection threads are enabled.

Figure 13:
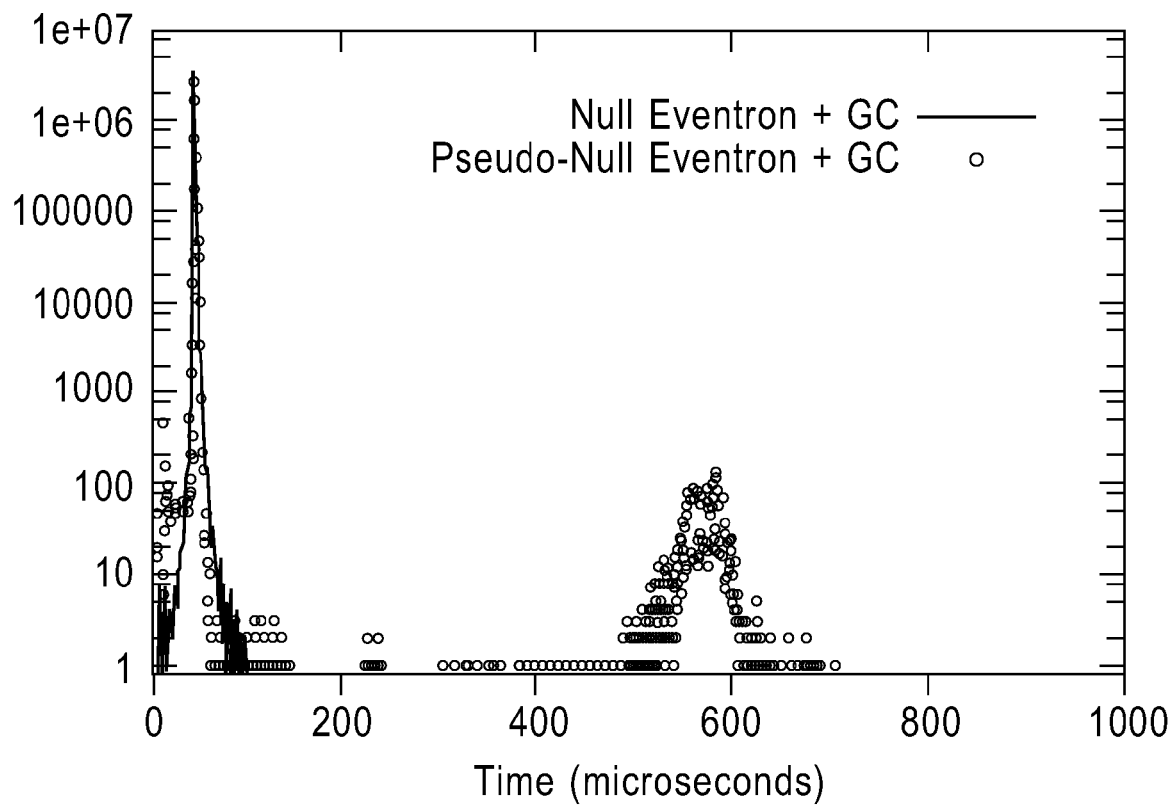

To demonstrate the effectiveness with which Constructs address the latency problem, the the Construct was replaced with an equivalent Java version which runs at high priority. FIG. 13 shows that the interarrival times of a regular Java thread are far worse than that of a Construct. In fact, the outliers are so distant that we extended the x-axis from 130 µs to 1 ms. The number of outliers increases by a factor of 20, and these outliers are centered around 550 µs which is slightly greater than the time the garbage collection thread typically runs for. For non-realtime garbage collectors, the interarrival times would be even worse.

Performance Under Load: Constructs with CPU-bound Threads

After having established that the base performance of Constructs may be similar to that of a similar C application, the inventors tested the performance of Constructs when run in conjunction with regular Java threads in a single Java VM. To stress the system, the inventors chose four benchmarks from the SPECjvm98 suite (db, jack, javac, and mpegaudio) which are CPU-bound batch applications so that the threads are almost always eligible to run.

Figure 14:
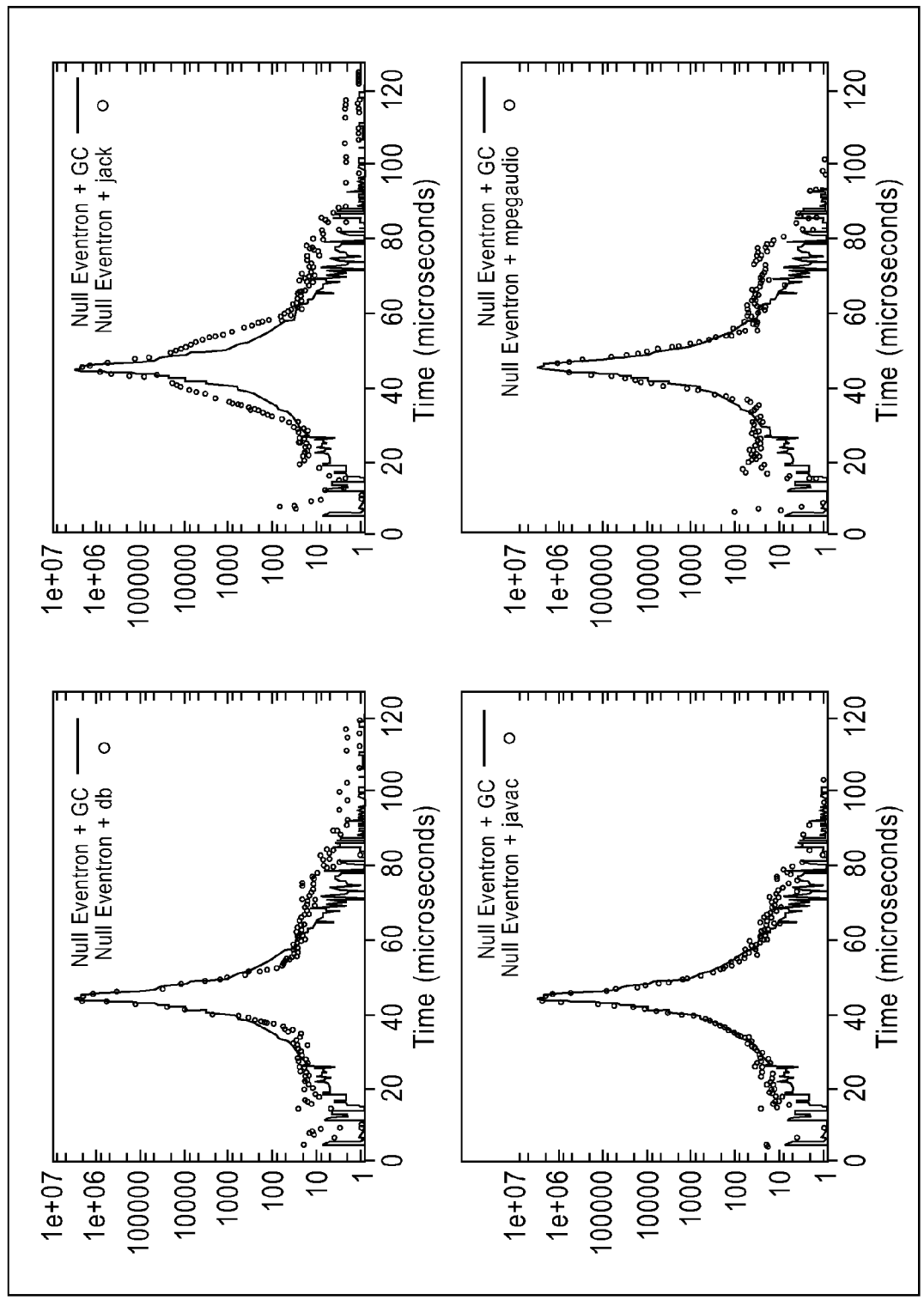

As FIG. 14 shows, the Constructs are slightly less timely when the system is under load and the deviation is dependent on the load. With db, the deviation is small, and 99.990% of the data falls within a 10 µs window. On the other hand, javac causes greater perturbations, and a 10 µs window includes only 99.986% of the samples. While these numbers are still very high, the differences are significant and show that other threads do cause definite perturbations. Because this version of Linux does not have the pre-emption patches (which at the time were too unstable), various system calls can cause the kernel to enter critical sections in which it will not yield. For example, a lower-priority thread can request a non-blocking I/O operation which nonetheless will block an unrelated Construct thread.

Figure 15:
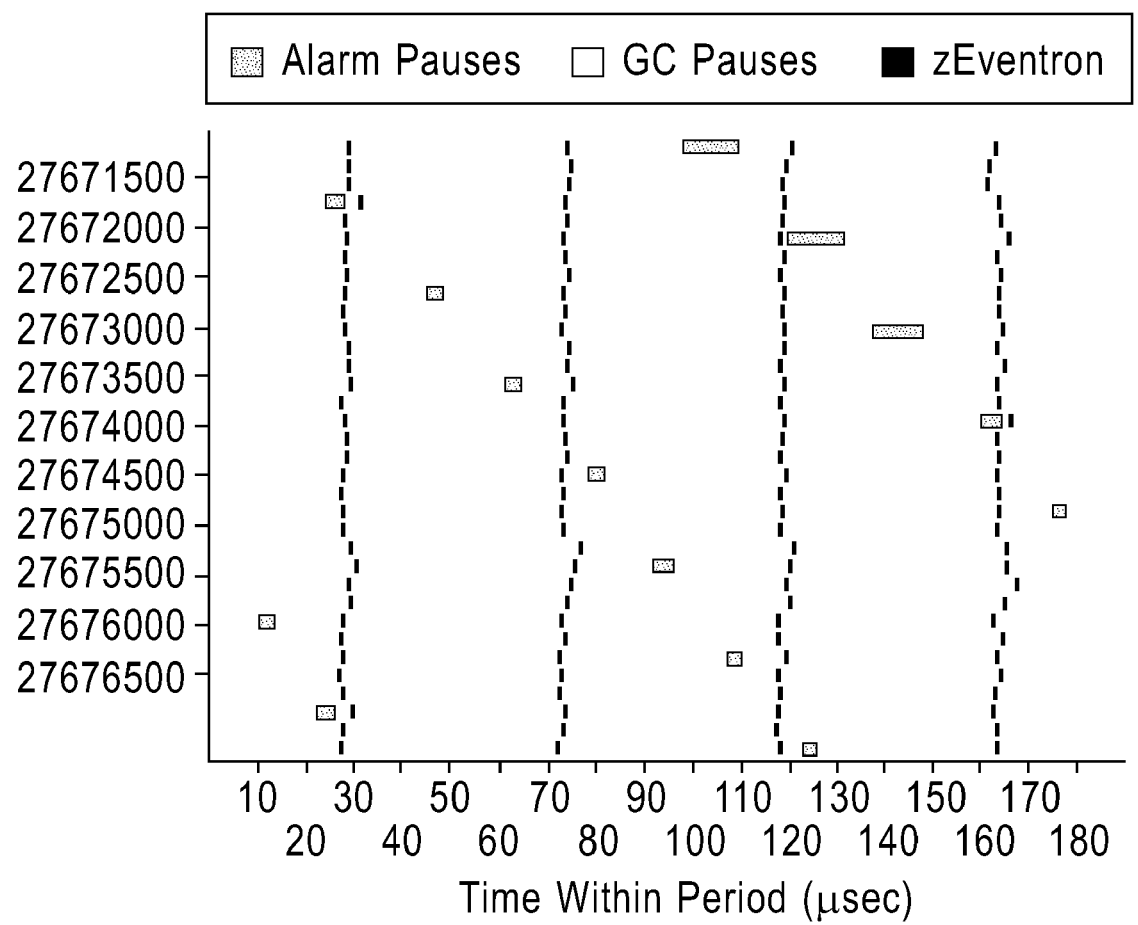
FIG. 15 illustrates an oscilloscope view of a Construct according to an exemplary aspect of the present invention.

FIG. 15 shows the passage of time as a series of strips or "scan lines" moving from left to right and then top to bottom. A Construct (dark gray) was executed every 45 µs. The width of oscilloscope view is exactly four times the period of the Construct, thus the Construct executions line up vertically. The alarm task (part of the GC scheduler) is shown in black and runs with a period of 200 µs, slightly longer than the width of the view, resulting in the staggering effect. Finally the GC execution is shown in light gray. Note that the Construct continues to run at fixed intervals despite the execution of the other tasks.

Interaction with Low-Frequency Tasks: Audible Constructs

The inventors tested the performance of the audible Construct that was described above. In addition to showing perturbation from the lower-priority low-frequency task, this example demonstrates that the wait-free channels perform as described. Since the audible Construct writes to /dev/dsp, timing anomalies may arise from operating system interactions. In fact, despite using non-blocking I/O, the system call write periodically takes quite a while.

Figure 16:
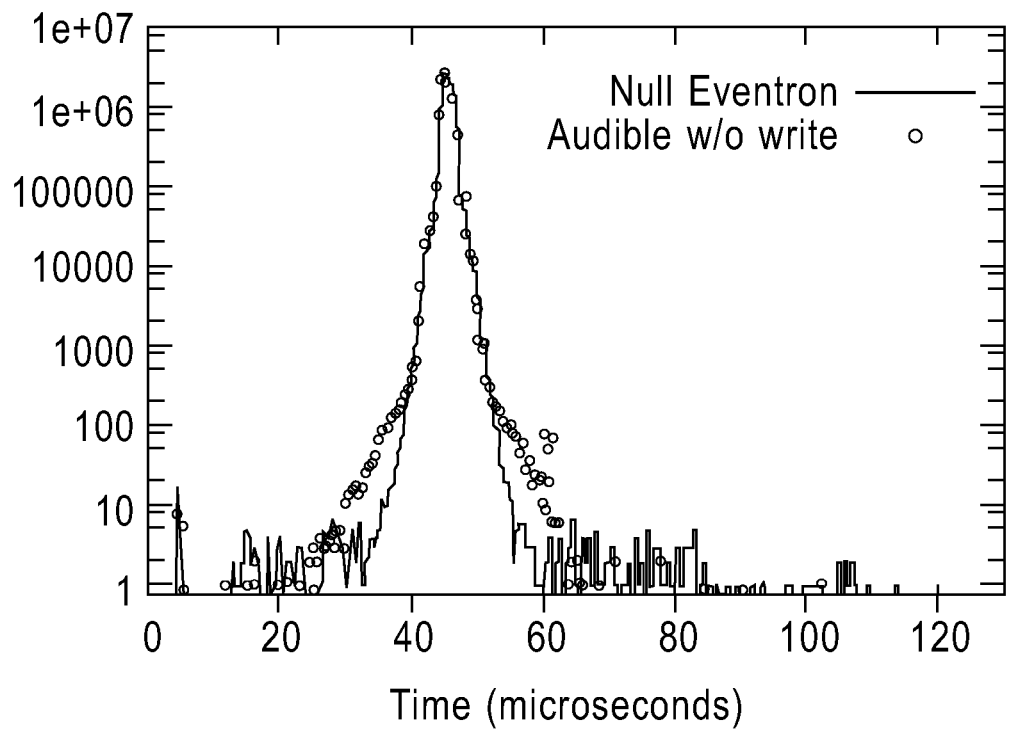
FIGS. 16-17 provide histogram plots which present the results from experiments conducted by the inventors.

Because this anomaly is not necessarily central to the Construct design but deals with lower-level aspects of specific devices, we first present performance result without the write in FIG. 16. There are no significant changes to the tail of the distribution although the central portion of the distribution grows slightly wider similar to effect of garbage collection in FIG. 12. The similarity suggests that the operating system does not always promptly schedule high-priority threads even when there is no interaction (via mutexes, for example) between the high- and low-priority threads.

Figure 17:
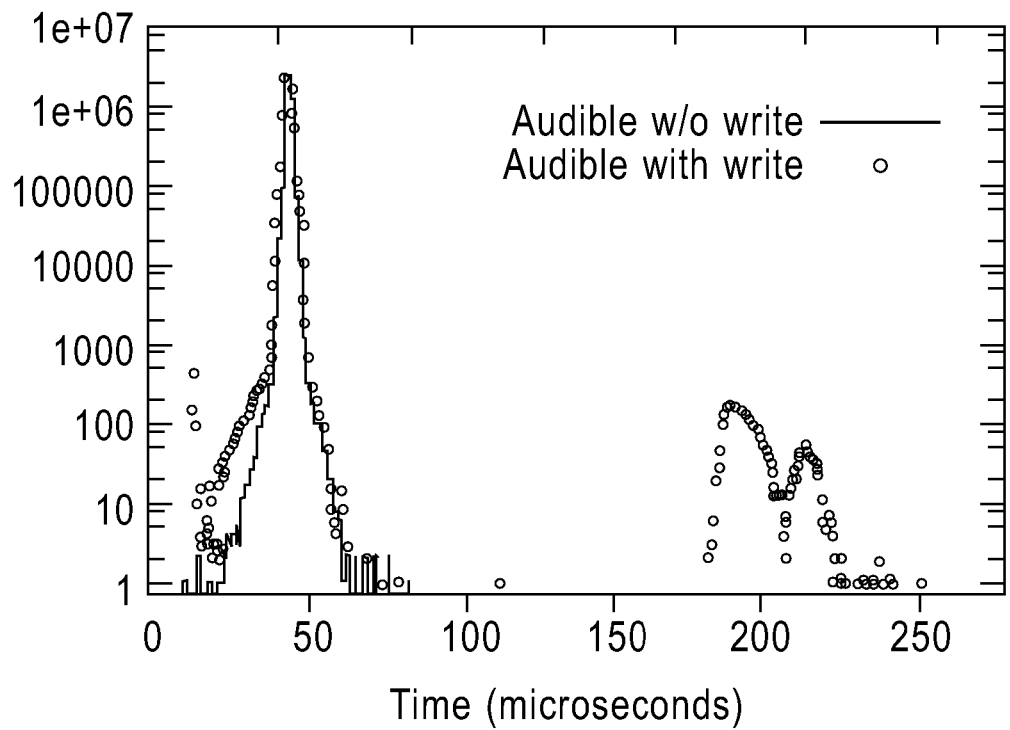
Figure 19:
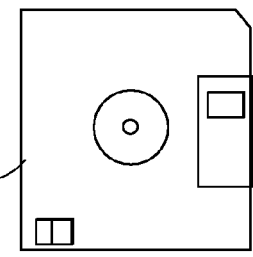
FIG. 19 illustrates a programmable storage medium 1900 tangibly embodying a program of machine-readable instructions executable by a digital processing apparatus to perform the method according to the exemplary aspects of the present invention.

Further, the inventors showed the pronounced effect of including the call to write in the audible Construct in FIG. 17. There is clearly a cluster of data centering around 200 µs. Examination of the raw data shows that every 93 ms, the call to write takes up to 220 µs instead of the usual 2 µs. The audio card performs double buffering and each buffer is 2048 samples in size. At 22050 Hz, this corresponds to 93 ms so we believe that, despite opening /dev/dsp with non-blocking I/O (which did improve matters), certain calls are still affected by buffering operations within the kernel.

Advantages Over Related Art

Construct validation may involve constructing a call graph and analyzing it to detect violations of the programming model. A wide range of call graph construction algorithms have been described. Static analyses have also been adapted to operate on-line and handle Java language features such as reflection, dynamic class loading, and JNI. However, unlike all of this previous work, the present invention may include a Construct validator which may analyze the code in the context of the exact object instances on which it will operate. This may significantly simplify analysis since the actual object instance can be reflectively examined to determine the types and contents of its fields.

The Real-Time Specification for Java (RTSJ) is a standard that defines a number of extensions and changes to the virtual machine and standard Java libraries to support real-time application development. The RTSJ defines NoHeapRealtimeThreads (NHRTs) as the proper high frequency tasks. NHRTs are forbidden from accessing any object allocated in the garbage-collected heap. Instead, NHRTs may allocate from either the ImmortalMemoryArea or one of the ScopedMemoryAreas. Objects allocated in the former will be preserved for the remainder of the life of the virtual machine; thus the ImmortalMemoryArea is suitable for only those objects that are allocated during the initialization phase of an application.

Programming effectively and safely with RTSJ scoped memory is widely recognized as being quite challenging.

Static type systems have been proposed to make it easier to write correct programs using RTSJ's scoped memory abstractions. In these systems, correctly typed programs cannot cause memory access violations, therefore all of the RTSJ mandated dynamic memory checks can be eliminated. Such systems statically partition heap connectivity, but allow real time tasks to dynamically allocate memory (using RTSJ scoped memory) within their heap partition. In a Construct programming model according to an exemplary aspect of the present invention, however, heap connectivity may not be restricted but dynamic memory allocation by the Construct may be forbidden.

Other related art has reported on a detailed performance comparison of a jRate RTSJ implementation and the RTSJ reference implementation (RI) from TimeSys. One relevant data point from these experiments is that it was observed that the RTSJ RI Periodic Thread implementation was only able to achieve predictable behavior for tasks with periods greater than or equal to 30 ms. Higher frequency tasks suffered significant jitter. In contrast, a Construct Implementation according to an exemplary aspect of the present invention may be capable of achieving highly predictable behavior for tasks with periods as small as 45 μs.

CONCLUSION

Constructs according to the exemplary aspect of the present invention may provide a simple and elegant means of writing tasks requiring extremely low latency while co-existing with a garbage-collected language. By taking advantage of Java's existing final mechanism, augmented with some run-time support to eliminate loopholes that could compromise safety, a simple data-sensitive analysis may be able to guarantee safety before Constructs begin executing. Constructs may be simpler to program, simpler to implement, more reliable, and more efficient than other approaches like scoped memory.

Constructs may make it feasible to program almost any real-time system entirely in pure Java code. Further, Constructs may be used to directly generate CD-quality audio waveforms and to write device drivers. The inventors believe that Constructs may make it possible to replace even the lowest levels of system software with safe code in a managed run-time system.

Another exemplary embodiment of the present invention includes an interrupt handler (e.g., in an operating system) which may be in a garbage collected language. The interrupt handler includes an interrupt module for interrupting an operation in the operating system, and a system for executing a task, including a first executing module for executing a first task in which garbage is collected using a garbage collector, and a second executing module for executing a second task which is associated with the interrupt module, the second task having a higher frequency than the first task, and the garbage collector being preemptable by the second task.

Figure 18:
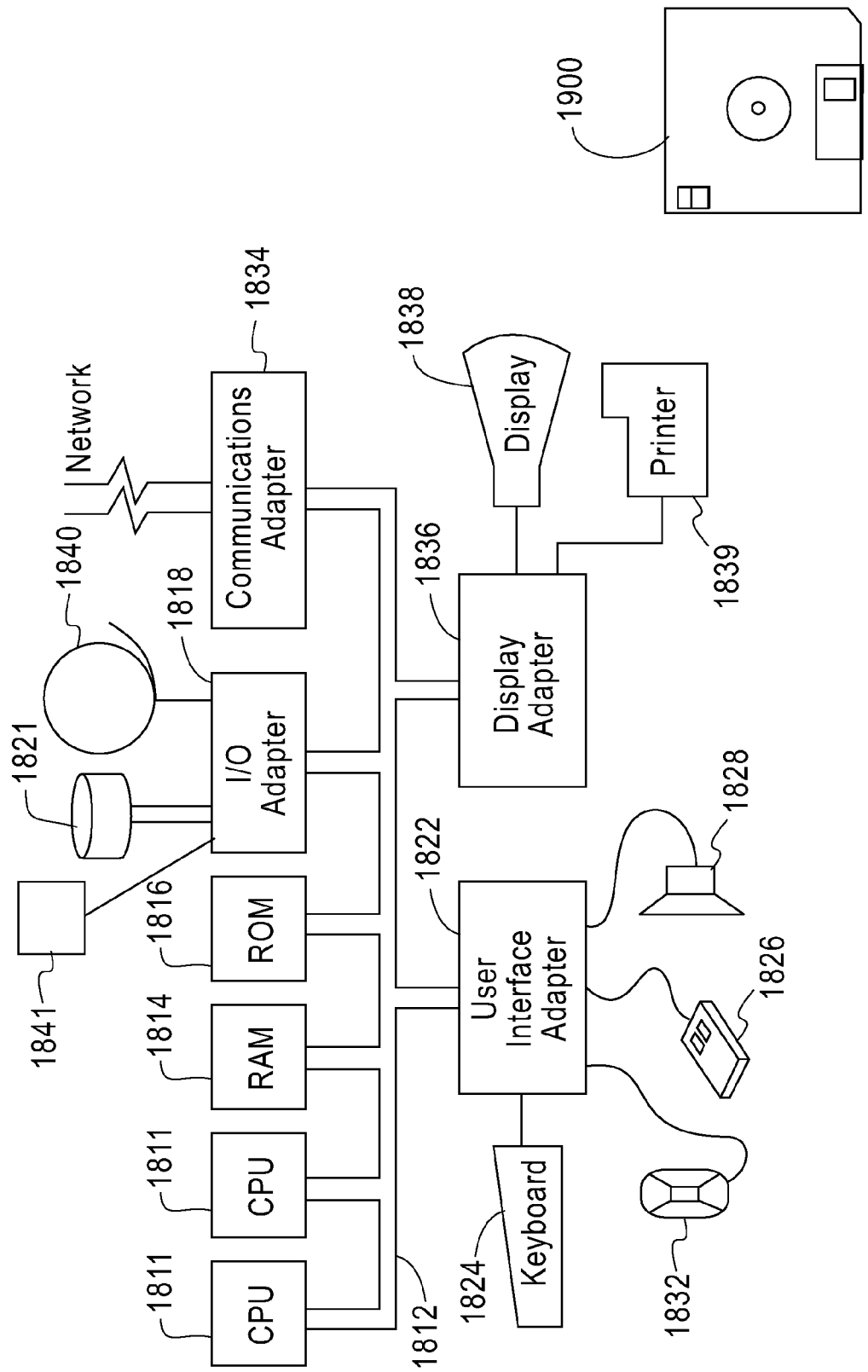
FIG. 18 illustrates a typical hardware configuration which may be used for implementing the system and method according to the exemplary aspects of the present invention.

Referring again to the drawings, FIG. 18 illustrates a typical hardware configuration which may be used for implementing the computer system and method according to the exemplary aspects of the present invention. The configuration has preferably at least one processor or central processing unit (CPU) 1811. The CPUs 1811 are interconnected via a system bus 1812 to a random access memory (RAM) 1814, read-only memory (ROM) 1816, input/output (I/O) adapter 1818 (for connecting peripheral devices such as disk units 1821 and tape drives 1840 to the bus 1812), user interface adapter 1822 (for connecting a keyboard 1824, mouse 1826, speaker 1828, microphone 1832, and/or other user interface device to the bus 1812), a communication adapter 1834 for connecting an information handling system to a data processing network, the Internet, and Intranet, a personal area network (PAN), etc., and a display adapter 1836 for connecting the bus 1812 to a display device 1838 and/or printer 1839. Further, an automated reader/scanner 1841 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1811 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 1811 and hardware above, to perform the method of the invention.

This signal-bearing media may include, for example, a RAM contained within the CPU 1811, as represented by the fast-access storage for example. Alternatively, the instructions may be contained in another signal-bearing media, such as a magnetic data storage diskette 1900 (FIG. 19), directly or indirectly accessible by the CPU 1811.

Whether contained in the computer server/CPU 1811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C" etc.

With its unique and novel features, the present invention provides a method (and system) of executing a task (e.g., a low latency task) which may be simpler to program and implement, more reliable and more efficient than other approaches.

It should be noted that while an exemplary aspect of the present invention has been described as being implemented using the Java programming language, the present invention is not necessarily limited to Java. That is, the present invention may be implemented using any garbage collected programming language.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of executing a task, comprising:
   executing a first task comprising a low-frequency task in which garbage is collected using a garbage collector;
   initializing a second task comprising a high-frequency task by:
      constructing an instance of a class that implements a standard runnable thread interface; and
      creating a data structure for supporting communication between said second task and lower priority threads, said data structure being accessible by a thread running in a garbage-collected heap in said first task to communicate data between said high-frequency task and said low-frequency task;
   validating said second task to ensure that said second task is executable without synchronizing with said first task, said validating said second task comprising determining a set of objects (O), a set of field signatures (F), a set of methods (M), and a set of virtual method signatures (V) which are accessible by said second task;
   instantiating said second task to create a class for executing said second task, said instantiating said second task comprising:
      creating an executable thread that will repeatedly invoke said second task;
      tracking said set of objects which are accessible by said second task;
      pinning said objects such that said objects are immovable by said first task;
      extending an interface to a run-time system with second task run-time support code for supporting said pinning of said objects;
      performing another pinning of said objects to determine if any pointers in said objects are stale and, if stale pointers are determined, updating said stale pointers;
      forwarding pointers for objects associated with said second task; and
      installing a set of objects which are accessible by said second task into run-time data structures such that said set of objects is external to said second task; and
   after said instantiating said second task, executing said second task, said garbage collector being preemptable by said second task, said executing said second task comprising:
      performing an allocation while handling an exceptional condition during said executing said second task; and
      adding a set of pinned objects to a global table for a duration of executing said second task to ensure that any object accessible to said second task is accessible from another root,
   wherein said second task is implemented using standard programming language constructs and wherein objects associated with said second task are automatically discovered by the run-time system,
   wherein objects associated with said second task reside in a garbage-collected heap, are referenceable by other objects in said garbage-collected heap, are pinned during a life of said second task, and are subject to garbage collection upon termination of said second task,
   wherein said executing said second task is performed without executing a run-time memory access check,
   wherein said determining said sets comprises a data-sensitive analysis,
   wherein said validating said second task comprises adding an identifier to a header of an object, and
   wherein only said second task run-time support code has access to said pinning said objects and unpinning said pinned objects.

2. The method of claim 1, wherein in said executing said second task, a priority of said second task is higher than a thread that schedules said first task.

3. The method of claim 1, wherein a thread for said executing said second task is distinguished from a thread for executing said first task by using a flag in a thread-specific data structure, said flag being used by a run-time scheduler to determine which threads should reach a safe point before a collection quantum begins.

4. The method of claim 1, wherein said second task is terminatable at any instruction without negatively effecting a remainder of a system in which said second task is executed.

5. The method of claim 1, wherein said frequency of said second task comprises a sampling frequency.

6. The method of claim 1, wherein said low-frequency task comprises a first frequency and said high-frequency comprises a second frequency greater than said first frequency.

7. The method of claim 1, wherein said low-frequency and high-frequency tasks are instantiated and initialized with a shared channel queue, and the high-frequency task is validated before being passed to a scheduler.

8. The method of claim 7, wherein said scheduler periodically invokes the high-frequency task.

9. The method of claim 1, wherein said validating said second task is performed while an application is running and before said second task is invoked.

10. The method of claim 1, wherein said validating said second task comprises creating a data-specific call graph for the data structure, and performing a set of checks on bytecodes of resulting methods.

11. The method of claim 4, wherein said executing said second task comprises:
performing an allocation while handling an exceptional condition during said executing said second task; and
adding a set of pinned objects to a global table for a duration of executing said second task to ensure that any object accessible to said second task is accessible from another root.

12. The method of claim 11, wherein said second task is implemented using standard programming language constructs and wherein objects associated with said second task are automatically discovered by the run-time system,
wherein objects associated with said second task reside in a garbage-collected heap, are referenceable by other objects in said garbage-collected heap, are pinned during a life of said second task, and are subject to garbage collection upon termination of said second task,
wherein said determining said sets comprises a data-sensitive analysis,
wherein said validating said second task comprises adding an identifier to a header of an object, and
wherein only said second task run-time support code has access to said pinning said objects and unpinning said pinned objects.

13. A system for executing a task, comprising:
a first executing module for executing a first task comprising a low-frequency task in which garbage is collected using a garbage collector which manages a memory;
an initializing module for initializing a second task comprising a high-frequency task by constructing an instance of a class that implements a standard runnable thread interface, and creating a data structure for supporting communication between said second task and lower priority threads, said data structure being accessible by a thread running in a garbage-collected heap in said first task to communicate data between said high-frequency task and said low-frequency task;
a validating module for validating said second task to ensure that said second task is executable without synchronizing with said first task, said validating said second task comprising determining a set of objects (O), a set of field signatures (F), a set of methods (M), and a set of virtual method signatures (V) which are accessible by said second task;
an instantiating module for instantiating said second task to create a class for said executing said second task, said instantiating module:
creating an executable thread that will repeatedly invoke said second task;
tracking said set of objects which are accessible by said second task;
pinning said objects such that said objects are immovable by said first task;
extending an interface to a run-time system with second task run-time support code for supporting said pinning of said objects; and
performing another pinning of said objects to determine if any pointers in said objects are stale and, if stale pointers are determined, updating said stale pointers;
forwarding pointers for objects associated with said second task; and
installing a set of objects which are accessible by said second task into run-time data structures such that said set of objects is external to said second task;
a second executing module for, after said instantiating said second task, executing said second task, said garbage collector being preemptable by said second task, said executing said second task being performed without executing a run-time memory access check and comprising:
performing an allocation while handling an exceptional condition during said executing said second task; and
adding a set of pinned objects to a global table for a duration of executing said second task to ensure that any object accessible to said second task is accessible from another root; and
an adding module for adding a set of pinned objects to a global table for a duration of executing said second task to ensure that any object accessible to said second task is accessible from another root.

14. An interrupt handler for an operating system comprising:
an interrupt module for interrupting an operation in said operating system; and
a system for executing a task, comprising:
a first executing module for executing a first task comprising a low-frequency task in which garbage is collected using a garbage collector which manages a memory;
an initializing module for initializing a second task comprising a high-frequency task by constructing an instance of a class that implements a standard runnable thread interface, and creating a data structure for supporting communication between said second task and lower priority threads, said data structure being accessible by a thread running in a garbage-collected heap in said first task to communicate data between said high-frequency task and said low-frequency task;
a validating module for validating said second task to ensure that said second task is executable without synchronizing with said first task, said validating said second task comprising determining a set of objects (O), a set of field signatures (F), a set of methods (M), and a set of virtual method signatures (V) which are accessible by said second task;
an instantiating module for instantiating said second task to create a class for executing said second task, said instantiating module:
creating an executable thread that will repeatedly invoke said second task;
tracking said set of objects which are accessible by said second task;
pinning said objects such that said objects are immovable by said first task;
extending an interface to a run-time system with second task run-time support code for supporting said pinning of said objects;
performing another pinning of said objects to determine if any pointers in said objects are stale and, if stale pointers are determined, updating said stale pointers;
forwarding pointers for objects associated with said second task; and installing a set of objects which are accessible by said second task into run-time data structures such that said set of objects is external to said second task;

a second executing module for, after said instantiating said second task, executing said second task, said garbage collector being preemptable by said second task, said executing said second task being performed without executing a run-time memory access check and comprising:

performing an allocation while handling an exceptional condition during said executing said second task; and adding a set of pinned objects to a global table for a duration of executing said second task to ensure that any object accessible to said second task is accessible from another root; and an adding module for adding a set of pinned objects to a global table for a duration of executing said second task to ensure that any object accessible to said second task is accessible from another root.

* * * * *